Figure 1:
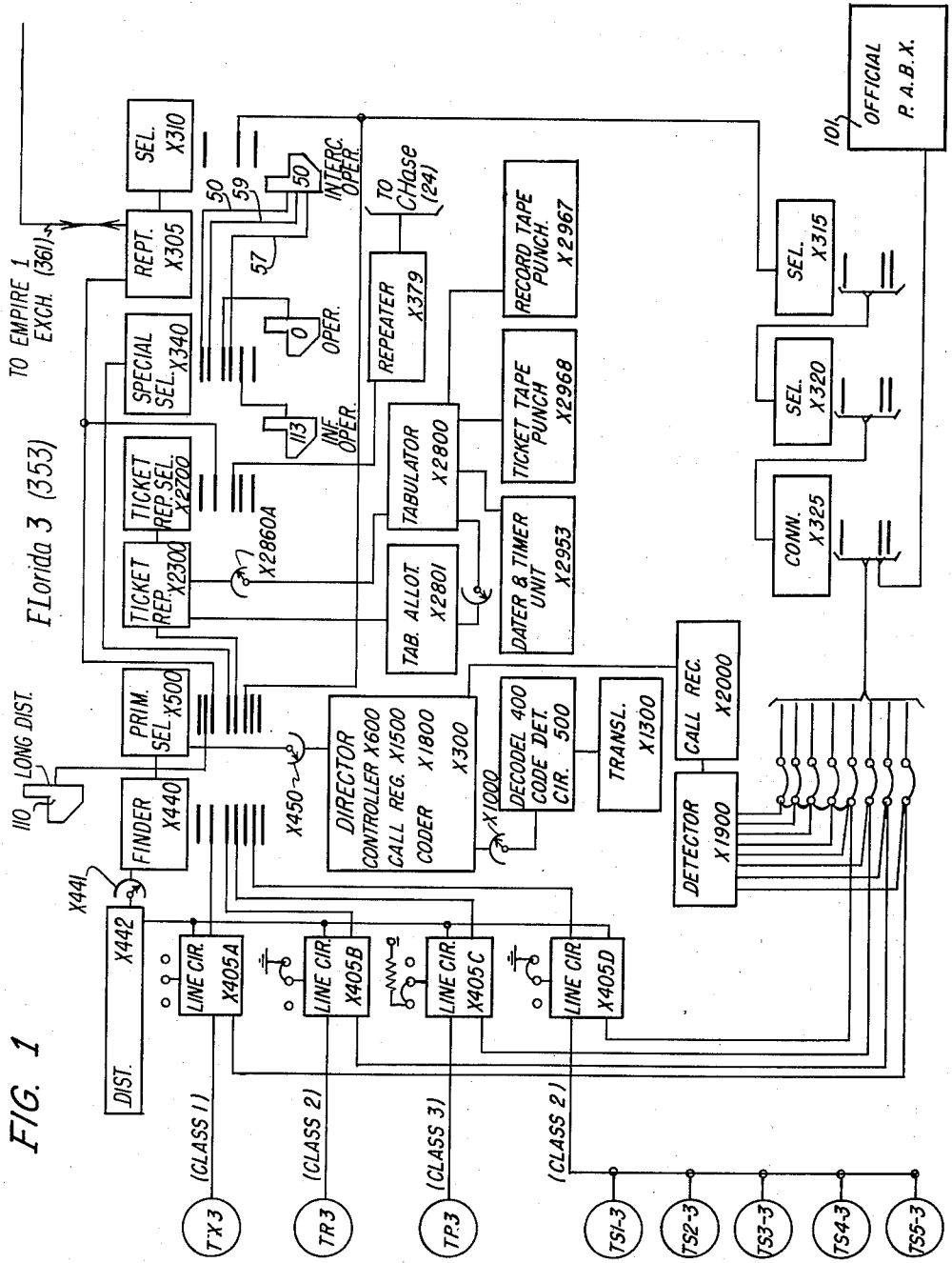

INVENTOR.
Thomas G. Walsh

INVENTOR.
Thomas G. Walsh

INVENTOR.
Thomas G. Walsh

Dec. 23, 1958 T. G. WALSH 2,866,003
AUTOMATIC TOLL TICKETING SYSTEM
Filed Aug. 12, 1954 10 Sheets-Sheet 4

INVENTOR.
Thomas G. Walsh

INVENTOR.
Thomas G. Walsh

INVENTOR.
Thomas G. Walsh

INVENTOR.
Thomas G. Walsh

INVENTOR.
Thomas G. Walsh

Dec. 23, 1958 T. G. WALSH 2,866,003
AUTOMATIC TOLL TICKETING SYSTEM
Filed Aug. 12, 1954 10 Sheets-Sheet 9

INVENTOR.
Thomas G. Walsh

United States Patent Office 2,866,003
Patented Dec. 23, 1958

2,866,003

AUTOMATIC TOLL TICKETING SYSTEM

Thomas G. Walsh, San Fernando, Calif., assignor to General Telephone Laboratories, Incorporated, a corporation of Delaware Application August 12, 1954, Serial No. 449,345

16 Claims. (Cl. 179—18)

The present invention relates to automatic telephone systems in general, and in particular to improvements in automatic toll ticketing telephone systems arranged to produce a record of certain items of information pertaining to each telephone connection. More particularly, this invention pertains to improvements in automatic toll ticketing systems of the character disclosed in the John E. Ostline Patent No. 2,678,353, granted May 11, 1954, and in the Ostline application Serial No. 205,460, filed January 11, 1951, now Patent No. 2,740,836, granted April 3, 1956.

An automatic toll ticketing telephone system of the type disclosed in the above-mentioned Ostline patent is divided into a plurality of zones and each zone includes one or more telephone exchanges. Telephone connections established between the subscribers in different exchanges in the different zones and between the subscribers in different exchanges in the same zone are handled on a toll basis so that charges for the connections may be assessed against the calling subscriber substations in accordance with the distances between the exchanges and the time duration of the connections. Each telephone connection is established automatically and a record is produced containing the particulars concerning the connection, including the office code digits identifying both the calling and called exchanges, the numerical digits identifying both the calling and the called subscriber lines, and other pertinent particulars, such as the rate of charge applicable to the connection, the duration thereof, the date and possibly the toll charge for the call.

The telephone connections, in the above-noted Ostline patent, are automatically completed from a calling subscriber to a desired called subscriber under control of a director or register sender apparatus provided in the originating exchange. In extending a connection, the calling subscriber merely operates his calling device in accordance with the directory number of the desired called subscriber station. The directory number includes an office code portion comprising the first two letters of the called exchange name and a digit identifying the number of the particular called exchange, and a numerical portion comprising four digits designating the called subscriber substation in the particular called exchange. Consequently, each subscriber directory number normally constitutes a seven-digit number. Certain exchanges in the system however are identified by an office code portion comprising the first two letters of the called exchange name and a numerical portion comprising four digits designating the called subscriber substations. Therefore, the directory numbers of the subscriber substations in the exchanges identified by a two-digit office code constitute a six-digit number instead of a seven-digit number. In either event, the first three digits of a called office code dialed by a calling subscriber are registered in the director or register sender and are translated into one or more routing digits so that the call will be properly routed to the particular called exchange. The first three digits of a seven-digit called number will include the first two letters of the desired called exchange name and the digit identifying the particular called exchange, and the first three digits of a six-digit number will include the first two letters of the called exchange name and the thousands-digit of the numerical portion of the particular called subscriber substation number. In addition to determining the routing digits to be transmitted by the director or register sender, the first three digits dialed by the calling subscriber also control the register sender to transmit thereafter certain of the digits of the called subscriber directory number to complete the desired connection.

In the above-mentioned Ostline patent, an idle director or register sender is automatically associated with the calling subscriber line as soon as a call is initiated and the digits of the called subscriber directory number, as dialed by the calling subscriber, are registered therein. In response to the registration of the first three digits of the called subscriber directory number, a common translator mechanism is automatically associated with the register sender to perform the translation operation briefly noted above. In other words, the translator mechanism functions to translate the first three digits registered in the register sender into one or more routing digits and it registers the routing digits in the register sender. The translator mechanism is then disconnected and rendered available to other register senders. Thereafter the register sender transmits the routing digits registered therein, then certain digits of the called exchange code, and finally the four digits of the numerical portion of the called subscriber directory number in order to complete the telephone connection to the called subscriber. During the establishment of the above-mentioned connection, various items of record information pertaining thereto, such as the calling subscriber directory number, the called subscriber directory number, the rate of charge for the call, and other pertinent items of information, are temporarily registered so that a record may be produced of the telephone connection and charged against the calling subscriber.

During the establishment of the above described telephone connection, an idle toll ticket repeater is also included in the connection for the purpose of registering and storing the items of record information. This repeater times the established connection, and upon the termination of the connection will have registered therein the total elapsed conversation time of the particular telephone call.

Following the release of the connection, an idle tabulator is associated with the toll ticket repeater so that the items of record information which have been transferred to and temporarily stored in the toll ticket repeater may be transferred to the tabulator before the repeater is released and rendered available for another call. The tabulator thereafter controls a ticket tape punch mechanism and a record tape punch mechanism in order to produce respectively an individual record and a common record of the completed toll call. These records may then be used by the operating telephone company to control appropriate business machines in order to produce printed records of the items of information pertaining to each toll call contained on the perforated tapes.

The main object of the present invention is to provide improved circuits and apparatus for an automatic toll ticketing system of the type noted above whereby certain of the apparatus in each of the directors or register senders is eliminated therefrom and is instead made available to a plurality of register senders.

It is a further object of the invention to provide in an automatic telephone system an improved register sender or director of simplified design, wherein certain apparatus, including a directively operated switching mechanism, formerly an integral part of each register sender, has been removed therefrom and the operations and controls thereof are instead made available to a plurality of register senders in the exchange.

Still another object of the invention is to provide in an automatic telephone system employing register senders, common office code translating apparatus that is selected for the exclusive use of a register sender and is operated in accordance with the called office code digits of a telephone directory number to translate the office code digits into predetermined routing digits.

A still further object of the invention is to provide in an automatic telephone system employing register senders and common translating apparatus, facilities for translating a called office code into appropriate routing digits to route the call to a called station even though the numerical digits of the called subscriber number have not been registered in the register sender.

It is still another object of the present invention to provide in an automatic telephone system employing register senders, apparatus that is common to a plurality of register senders and is associated with any particular register sender so that it may be controlled in accordance with the digits of a called office code to select a particular translate relay in the common translator. With this arrangement, the selective control of a translate relay in the common translator is performed by equipment that is also common to the plurality of register senders. The foregoing operations were performed in the prior toll ticketing systems by a two-motion directively operated switch forming a component part of each register sender.

A still further object of the invention is to provide in a toll ticketing telephone system, means for charging the called subscriber station instead of the calling subscriber station for a connection by utilizing a special office code, instead of the regular office code in extending a connection to a particular called subscriber station.

Further objects and features of the invention pertain to the particular arrangement of the circuit elements of the automatic telephone system whereby the above outlined and additional operating features are attained.

The invention, both as to its organization and method of operation, together with further objects and advantages thereof, will best be understood by reference to the following specification taken in connection with the accompanying drawings in which Figure 1 is a trunking diagram illustrating the general arrangement of the switching apparatus incorporated in the FLorida 3 exchange of the telephone system. Figs. 2 to 10, inclusive, when assembled together in the manner shown on Fig. 11, illustrate sufficient details of the switching apparatus included in the FLorida 3 exchange, to describe the apparatus having incorporated therein the features of the invention briefly outlined above.

It should be noted that the apparatus schematically illustrated in the different drawings is identified by numerical designations, some of which designations are prefixed by the letter "X." The prefix X has been provided as part of the numerical designation of different details of equipment, to facilitate cross-referencing the same with corresponding equipment and apparatus shown in the previously mentioned Ostline Patents Nos. 2,678,353 and 2,740,836 wherein like equipment is identified by the same numerical designations.

The switching apparatus included in the FLorida 3 exchange is schematically illustrated in block diagram form in the trunking diagram shown in Fig. 1. Some of the apparatus shown in Fig. 1 is identified by a numerical designation identifying corresponding apparatus provided in the previously mentioned Ostline Patents Nos. 2,678,353 and 2,740,836 except that the numerical designation includes the prefix "X." Particular attention is directed to the fact that the director X300 comprises a controller X600, a call register X1500, a coder X1800 and a call recorder X2000A. In the prior systems illustrated in the prior Ostline Patents Nos. 2,678,353 and 2,740,836, the director also included a Strowger switch 1200 which has been eliminated from each of the directors of the present system.

Figure 2:
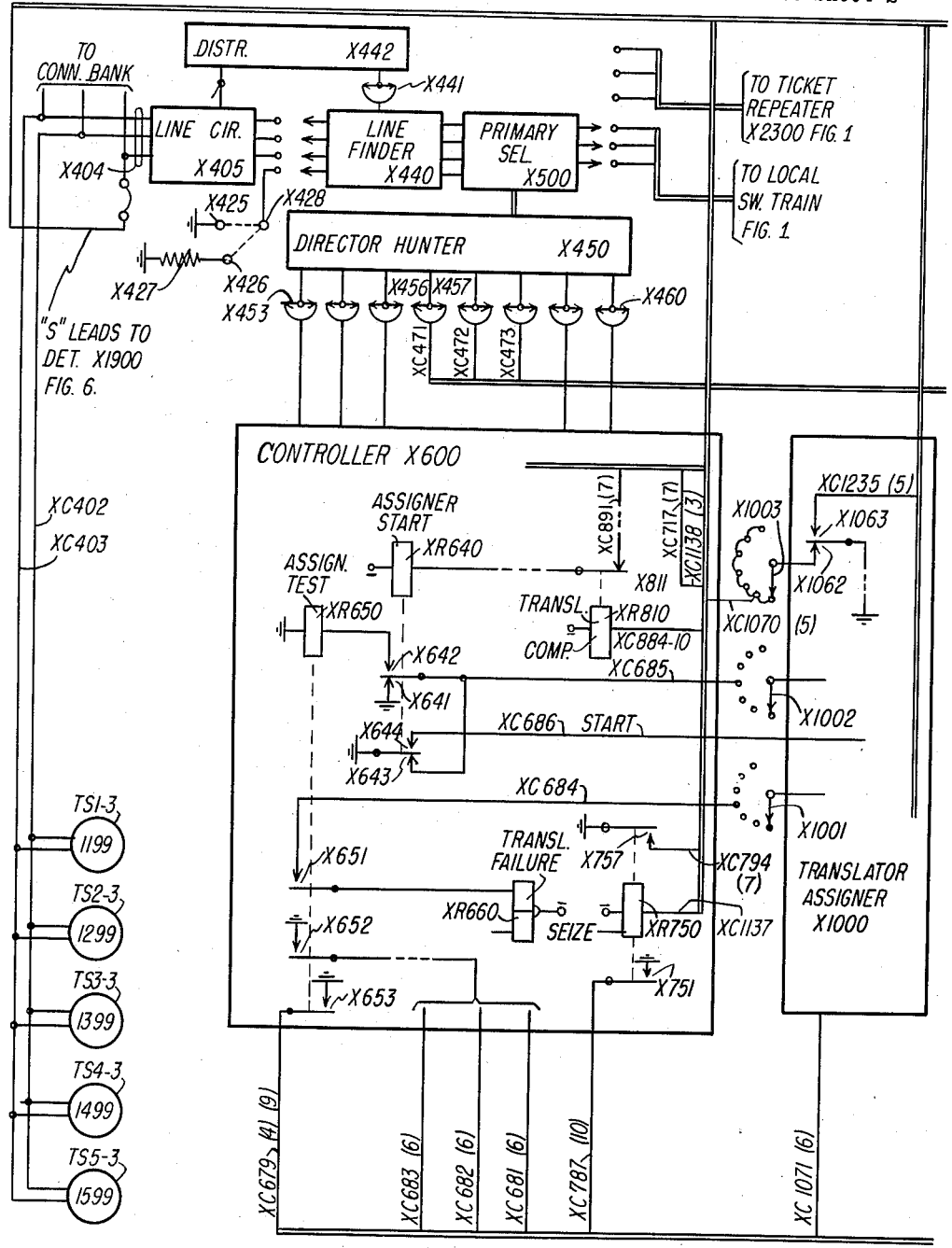

Referring now to the drawings, it will be seen that Fig. 2 schematically illustrates five subscriber substations TS1-3 to TS5-3, inclusive, on a five party line which are connected by way of the line conductor XC402 and XC403 to the line circuit X405. This line circuit is schematically illustrated in block diagram form and is connected to bank contacts accessible to the finders of the system including the finder X440 which is individually associated with a primary selector X500. The line finder X440 may be of the type illustrated in the Bakker Patent No. 2,289,896, granted July 14, 1942, and in the present system is illustrated in block diagram form. The line circuit X405 and the primary selector X500 are also illustrated in block diagram form and they may be of the type shown respectively in Figs. 4 and 5 of the previously noted Ostline patent. Fig. 2 also discloses a director hunter X450 which is the same as the corresponding director hunter provided in either the Ostline application or patent previously noted. The director hunter X450 has access, by way of its wipers X453 to X460 and associated bank contacts, to any one of a plurality of directors or register senders, such as the director X300, shown in the trunking diagram of Fig. 1. As illustrated in Fig. 2, the director hunter X450 is shown having access to only the controller X600 portion of the director X300. Also, Fig. 2 schematically discloses a translator assigner X1000, which may be exactly the same as the translator assigner 1000 shown in the above noted Ostline patent, has access by way of its wipers X1001 to X1003 and associated contact banks to various parts of the particular director that has been selected by the director hunter X450.

Figure 3:
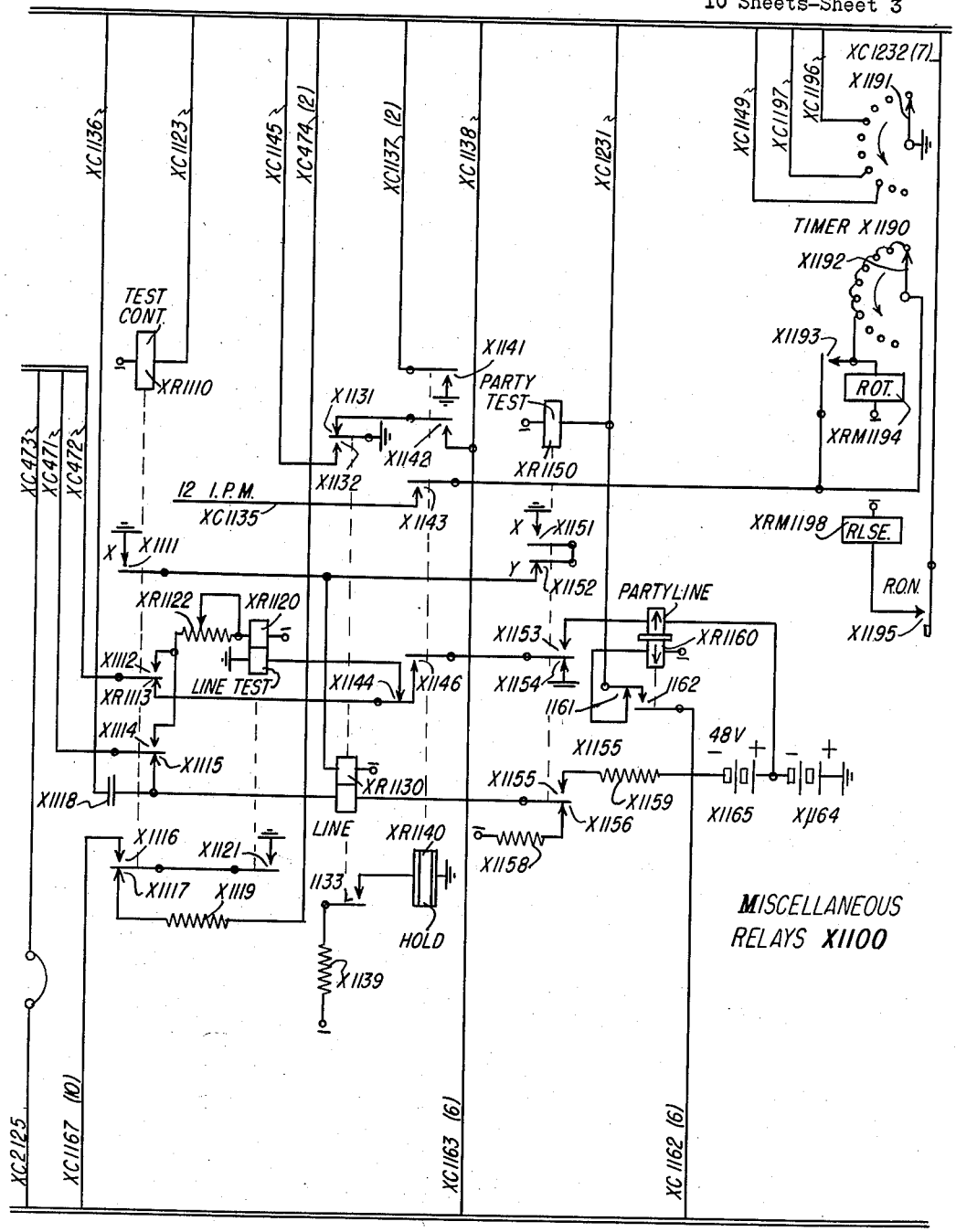
Figure 7:
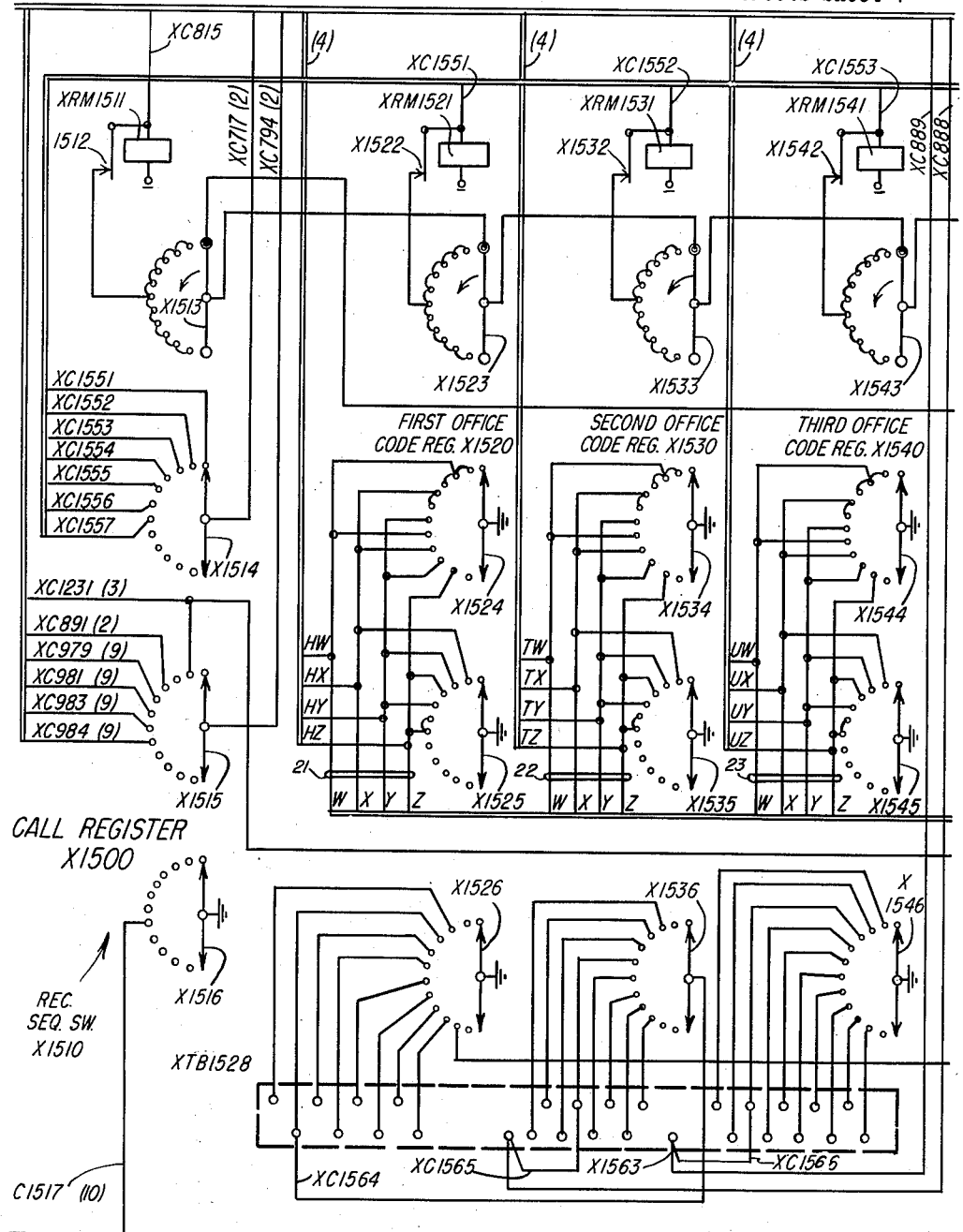
Figure 8:
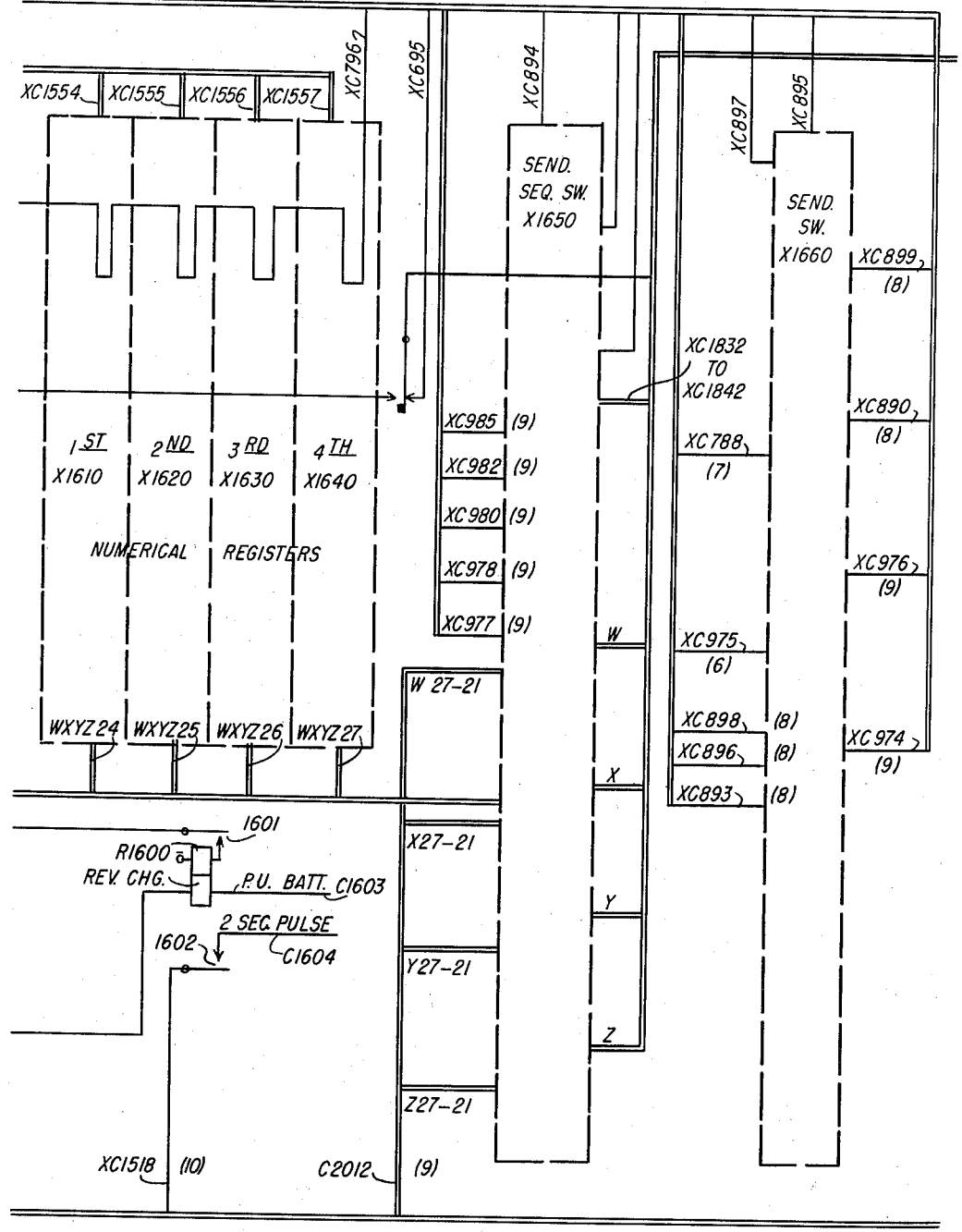

Figs. 3 and 7 to 10, inclusive, show other portions of the director, partially shown in detail and partially schematically illustrated, in order more clearly to illustrate and describe the improvements of the circuits of the present invention. More specifically, Fig. 3 shows the miscellaneous relays X1100, which was formerly the code switch 1100 in the prior Ostline patent and which have been modified in the present invention to omit the Strowger switch 1200 formerly included as part of the apparatus of the code switch 1100 portion of a director shown in the previously mentioned Ostline Patents Nos. 2,678,353 and 2,740,836. Figs. 7 and 8 show, partially in detail and partially schematically, the call register X1500 portion of the director which is substantially the same as the call register 1500 portion of the director illustrated in the previously mentioned Ostline patent and application except for modifications that have been made to carry out the features of the present invention. The call register X1500 portion of the director, as shown in Figs. 7 and 8, includes the receive sequence switch X1510 which determines the sequence in which received digits are registered in the respective digit registers of the call register X1500.

The first, second and third office code registers X1520, X1530 and X1540 are provided to register the three digits of a called office code. The first, second, third and fourth numerical registers X1610, X1620, X1630 and X1640 have been schematically illustrated and they may be connected and arranged in substantially the same manner as the corresponding registers in the previously noted Ostline Patents Nos. 2,678,353 and 2,740,836. A send sequence switch X1650 is also schematically illustrated in Fig. 8 which is provided to determine the sequence in which the registered information in the coder X1800 and the call register X1500 is transmitted by the director under control of the send switch X1660. Both the send sequence switch X1650 and the send switch X1660 are schematically illustrated since they are the same as the corresponding switches 1650 and 1660 illustrated in the previously noted Ostline Patents Nos. 2,678,353 and 2,740,836.

Figure 9:
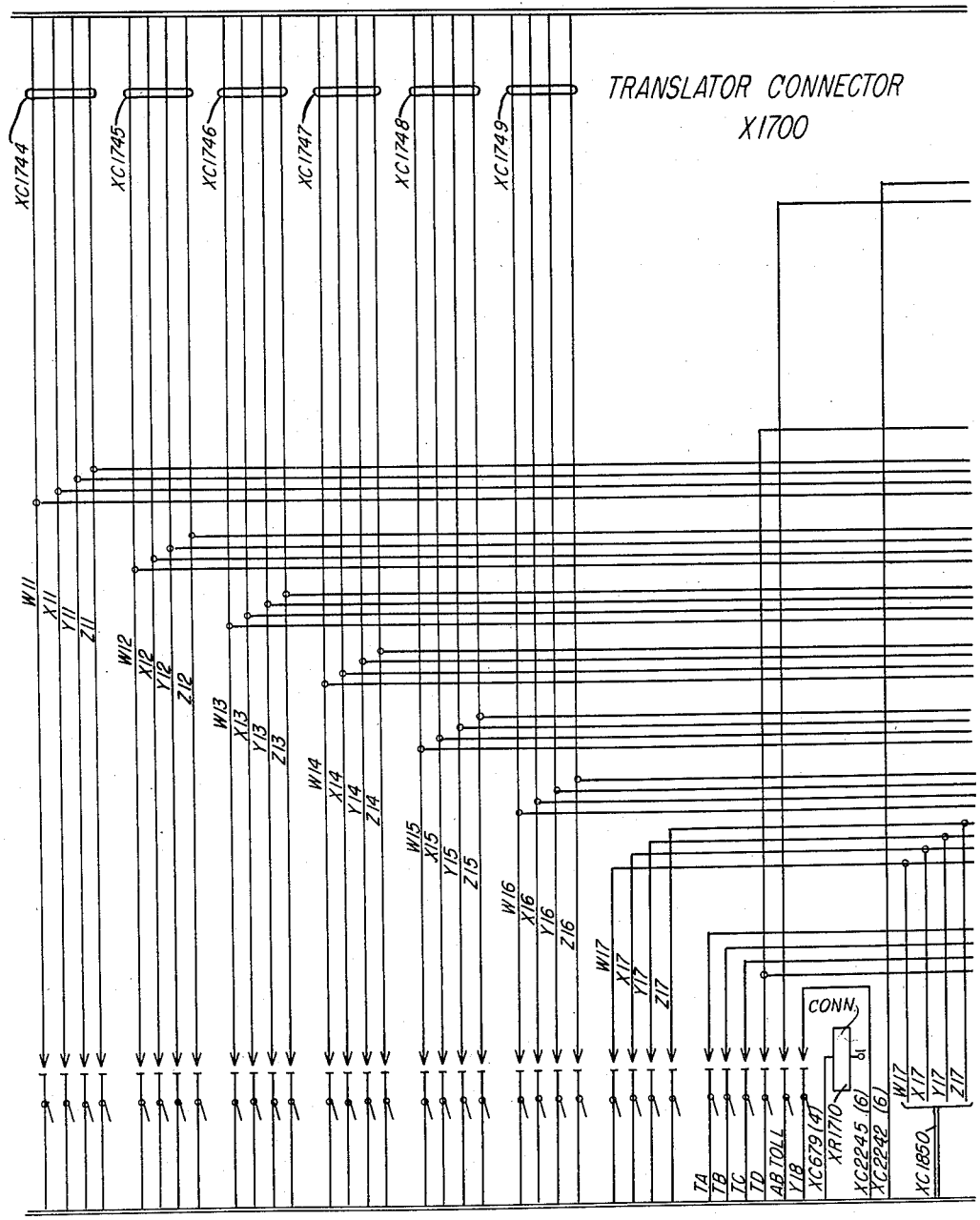
Figure 10:
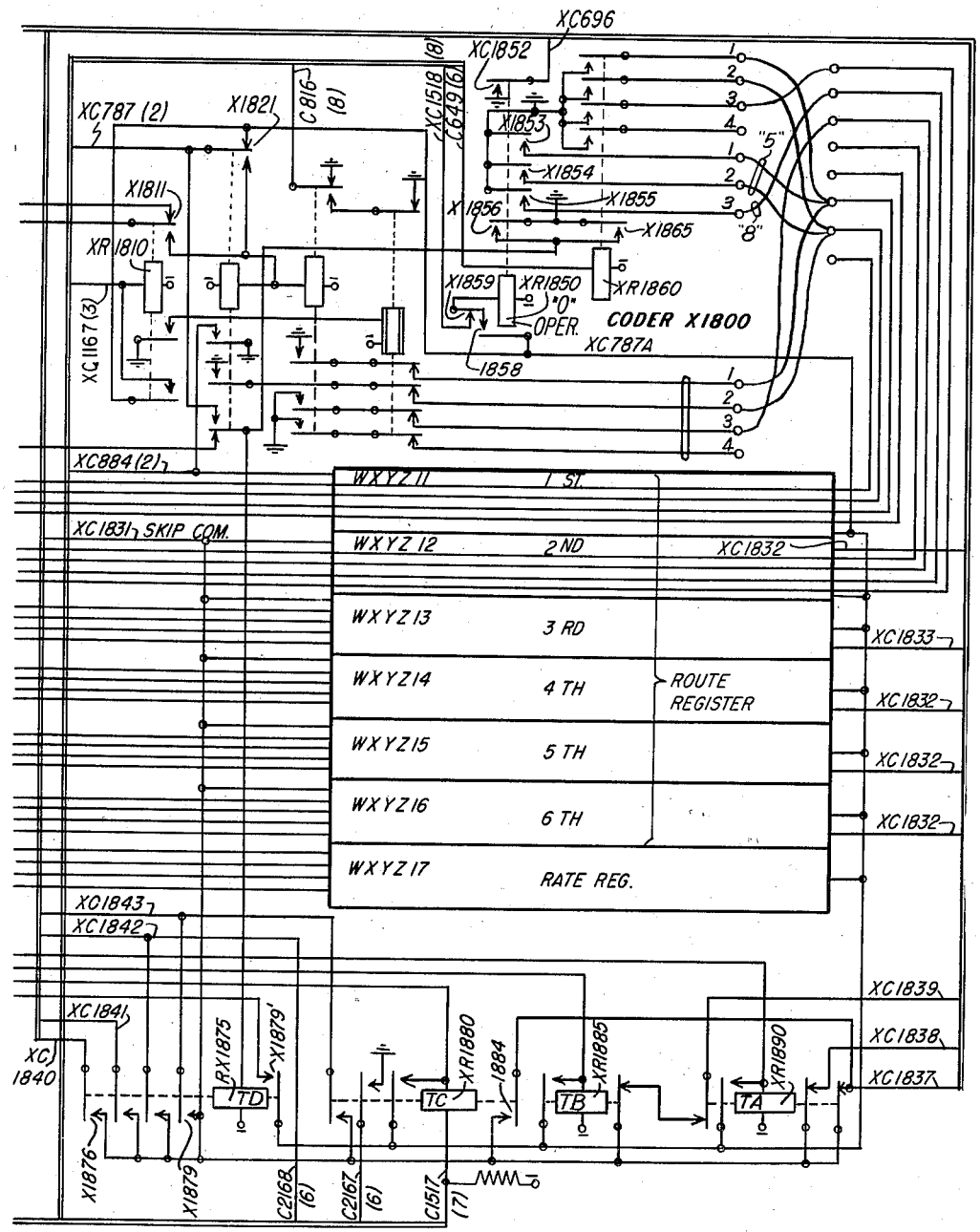

Fig. 9 discloses the translator connector X1700 which is substantially the same as the translator connector 1700 illustrated in the Ostline Patents Nos. 2,678,353 and 2,740,836, previously noted, and is provided to connect the common translator X1300 of Fig. 6 to the coder X1800 of Fig. 10. The translator connector X1700 is individual to the director X300 and it should be understood that each director is provided with a similar translator connector, such as X1700.

Referring now to Fig. 10, there is illustrated the coder X1800 portion of the director X300 which is utilized to register as many as six routing digits that have been determined by the selective operation of the translator X1300 under control of the called office code registered in the office code registers X1520, X1530 and X1540. Other selective controls performed by the various relays provided in the coder X1800 will be described hereinafter in connection with the detailed operation of the system.

Figure 4:
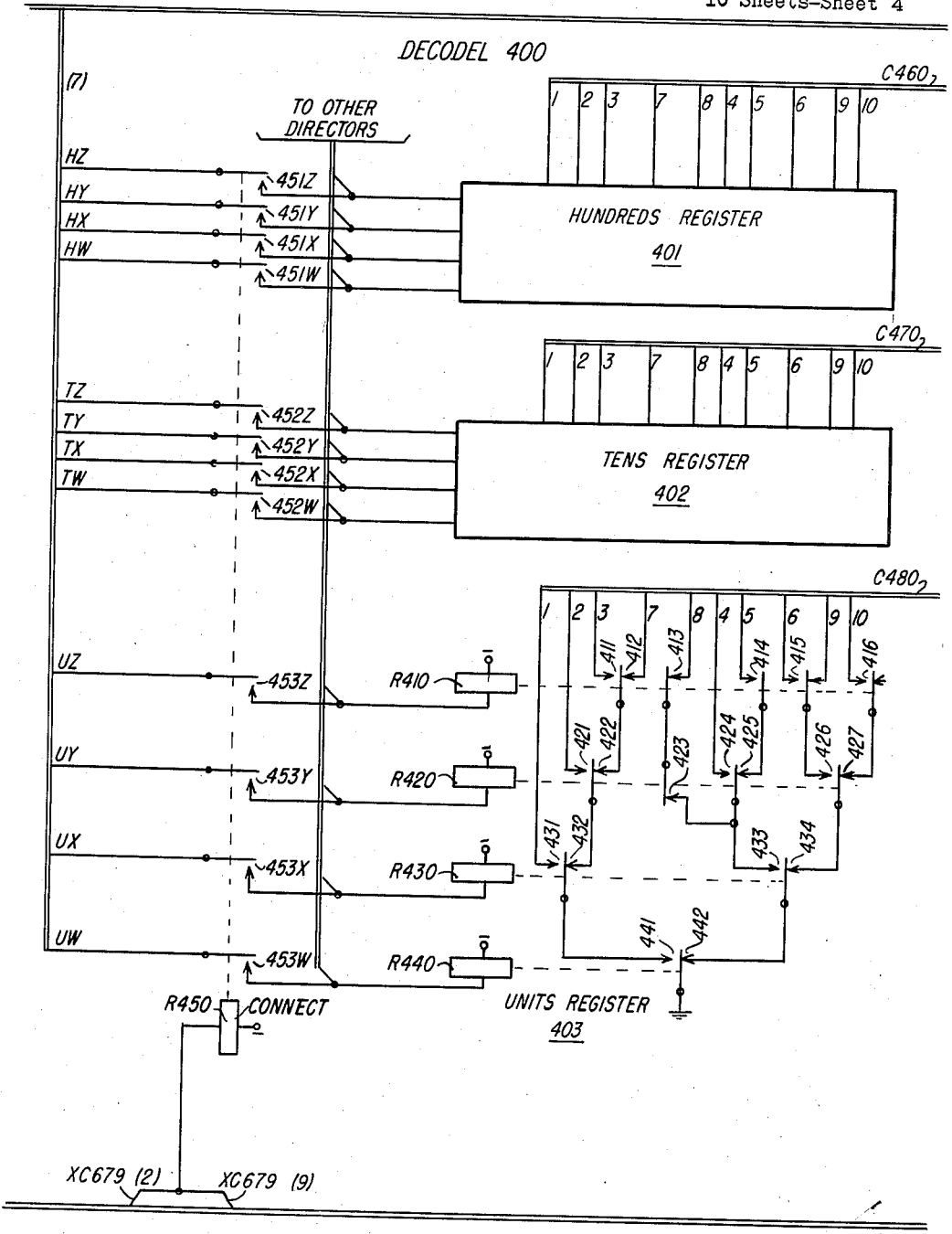

Fig. 4 shows the decodel circuit 400 which is common to all of the directors of the system and which is arranged to cooperate with the code detecting circuit 500 to perform the selective operation of the translator X1300 that was previously performed by the Strowger switch 1200 included in each of the directors of the prior systems. The decodel circuit 400 includes a hundreds register 401, a tens register 402 and the units register 403 which are connected and arranged so that they may be selectively operated in accordance with the three digits of a called office code registered respectively in the first, second and third office code registers X1520, X1530 and X1540 in the call register X1500 portion of the director. The registers of the decodel 400 are arranged so that they will translate the markings of the three digits of a called office code as registered in the call register X1500 from code markings into decimal markings corresponding to the hundreds, tens and units digits which are registered in the code detecting circuit 500 of Fig. 5.

Figure 5:
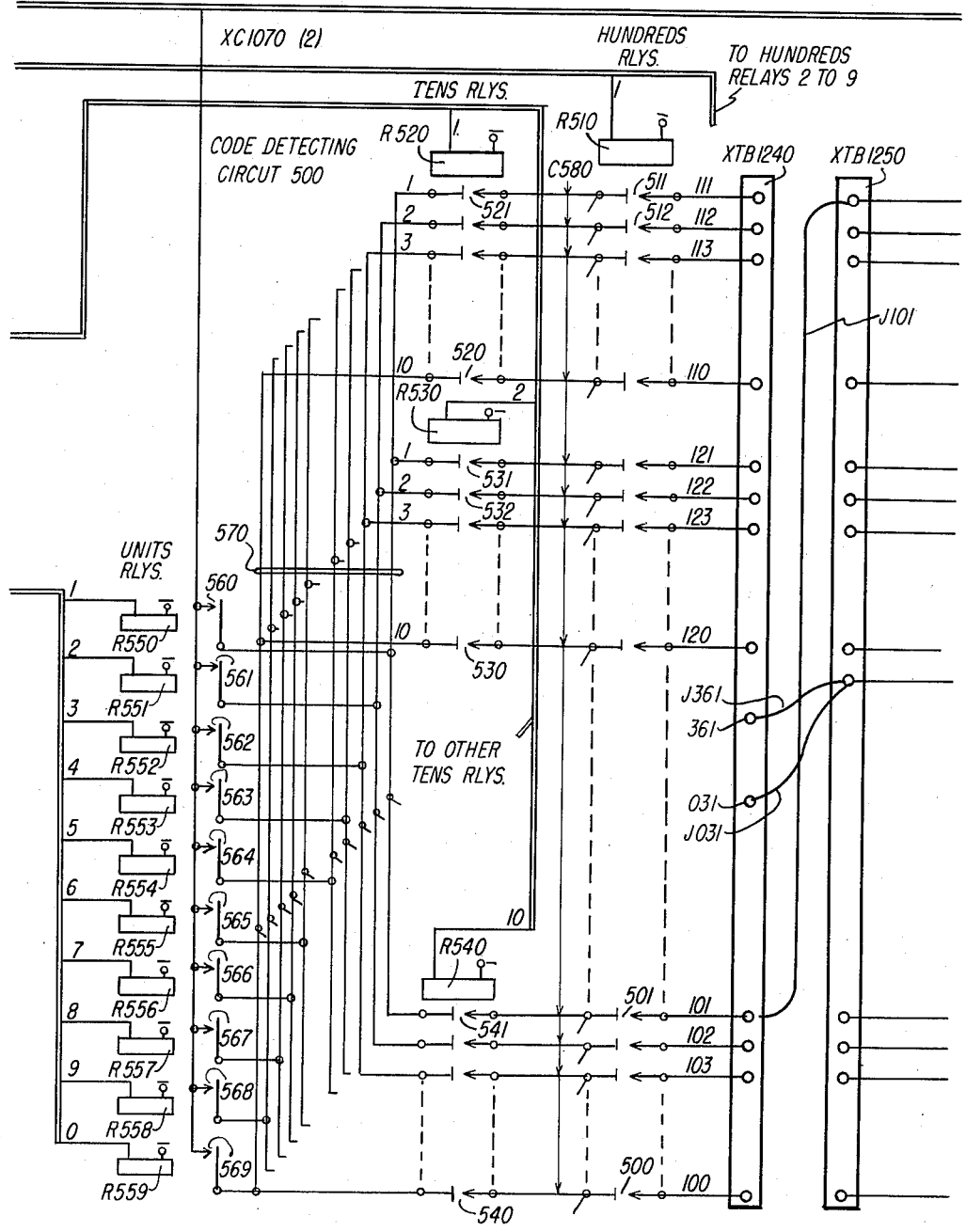
Figures 6, 11:
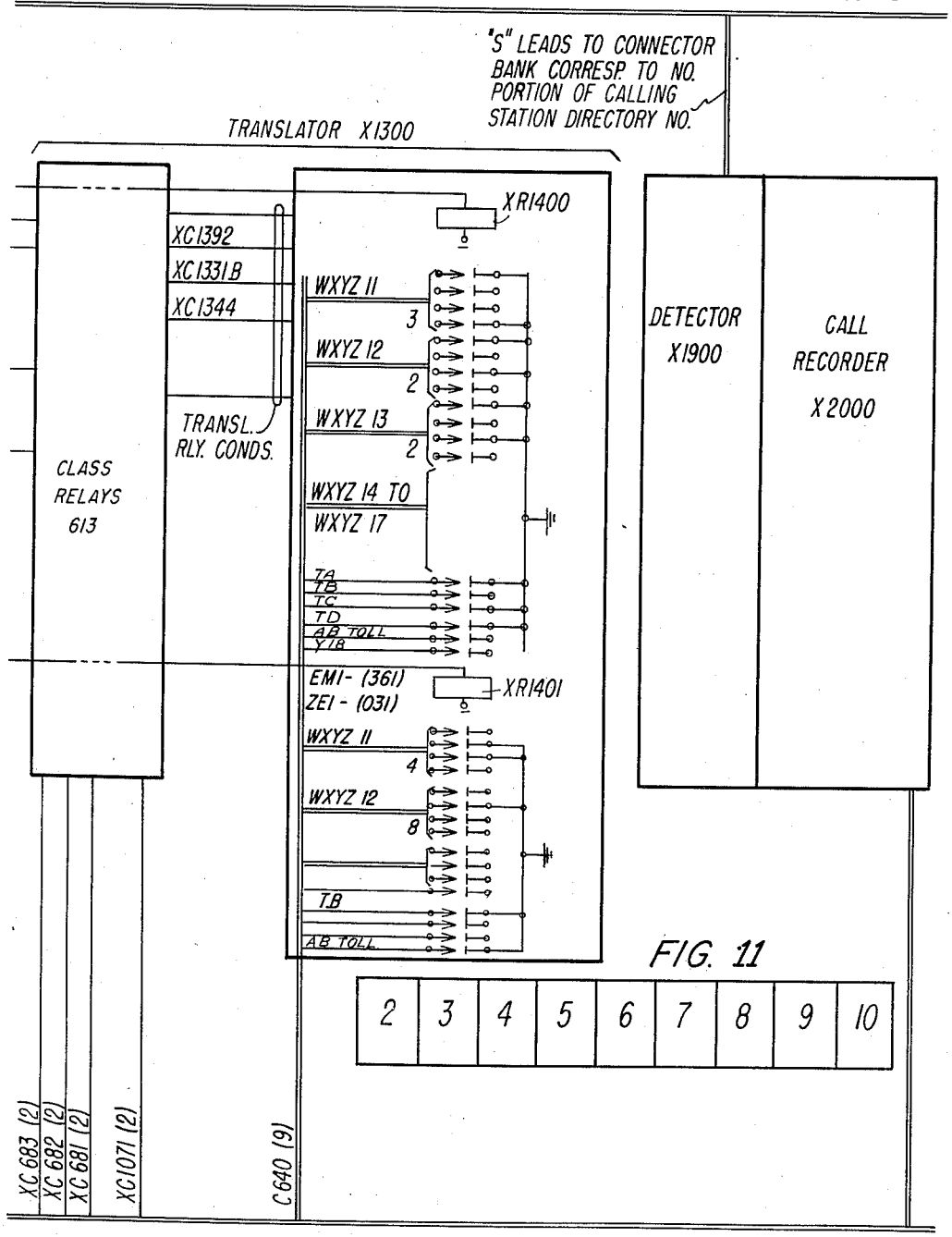

Fig. 5 shows the code detecting circuit 500 which is provided with ten hundreds relays, such as R510; ten tens relays, such as R520; and ten units relays, such as R550. The respective hundreds, tens and units relays of the code detecting circuit 500 are connected and arranged so that the operation of one of the relays on each of the three groups will select a single conductor in order to operate a translate relay corresponding to the called office code that has been registered in the call register X1500 portion of the director. With the three groups of hundreds, tens and units relays in the code detecting circuit 500, as many as 1000 different individual conductors may be selected to operate corresponding translate relays in the translator X1300. This arrangement provides facilities whereby each of 1000 different called office codes may be translated to select 1000 different translate relays.

Fig. 6 schematically illustrates the common translator X1300 which is substantially identical to the translator 1300 illustrated in Figs. 13 and 14 of the above noted Ostline patent. Fig. 6 also schematically illustrates the detector X1900 and the call recorder X2000. The call recorder X2000 is exactly the same as the call recorder 2000 illustrated in Figs. 19 to 22 in the above mentioned Ostline Patents Nos. 2,678,353 and 2,740,836. It should be understood, however, that the call recorder X2000 is included as a portion of the director X300 and that it may be associated with the detector X1900, which is common to all of the directors, by means of a detector connect relay that is individual to the call recorder in use. The detector X1900 may be the same as the detector 1900 shown schematically in the above mentioned Ost'ine patent and application and it may be of the type illustrated in Figs. 29 to 38, inclusive, in the Ostline Patent No. 2,586,704, granted February 19, 1952, or it may be of the type disclosed in the Ostline Patent No. 2,639,330, granted May 19, 1953.

Referring now to the trunking diagram shown in Fig. 1, it will be understood that only certain of the subscriber lines of the telephone system have been illustrated. Three of the lines respectively terminate the subscriber stations TX3, TR3 and the pay station line TP3. One of the lines commonly terminates the five subscriber substations TS1-3 to TS5-3, inclusive. Each of the above mentioned lines terminate respectively in a line circuit. Thus, the line of station TX3 terminates in the line circuit X405A, the line of station TR3 terminates in the line circuit X405B, the line of station TP3 terminates in the line circuit X405C, and the party line terminates in the line circuit X405D. Each private subscriber station TX3 is rendered extended service facilities and is of the class 1 type. Each private subscriber station TR3 and the five party line subscriber substations TS1-3 to TS5-3 are rendered free local service and are of the class 2 type. Each pay station TP3 is denied automatic toll service and is of the class 3 type.

More specifically, the extended subscriber substation in the system of the class 1 type are rendered free automatic local telephone service, free automatic toll service to certain exchanges in adjacent zones, for example, to the EMpire 1 exchange, and automatic toll ticketing service to other exchanges in the system. The private subscriber substations and the party subscriber substations of the class 2 type are rendered free automatic local service and they are also rendered automatic toll ticketing service on all calls extended to subscriber substations terminating in other exchanges of the system.

Finally, the pay stations of the class 3 type are rendered automatic local service, provided the necessary coins have been deposited in the pay station instrument, and they are rendered toll service to exchanges in the system with the aid of the "0" operator. Strapping facilities are provided at each line circuit to indicate the specific class of service rendered the associated subscriber substation and the detailed description of the strapping facilities is described in detail in the Ostline Patent No. 2,678,353.

It is noted that each of the above noted line circuits is accessible to the finder X440 and that the finder X440 is individual to the primary selector X500 which has access via its associated bank contacts to the various trunk lines extending to other switching apparatus in the exchange, including the local switch train comprising the selectors X315 and X320 and the connector X325, for completing local calls and also for completing connections to the official P. A. B. X 101. From another level of the associated banks, the selector X500 has access to the toll ticketing trunks, including the ticket repeater X2300 and the ticket repeater selector X2700, for extending toll connections by way of the repeater X379 to the CHase exchange, and also via the repeater X305 to the EMpire 1 exchange. All of the calls completed by way of any of the ticket repeaters X2300 are recorded.

Over still another level of the selector X500, calls may be completed by way of the special selector X340 to the intercepting operator 50, to the "0" operator, and to the information operator 113.

Over still another level the primary selector X500 may complete connections via the repeater X305 to subscribers in the EMpire 1 exchange without using any of the recording trunks and associated ticket repeaters, so that no record is made thereof. Access to the long distance operator 110 is had over another level of the primary selector X500.

The recording apparatus, including the ticket repeater X2300, the tabulator X2800, the tape punches X2967 and X2968 and their associated apparatus form no part of this invention and are therefore not described in detail. For a complete disclosure and description of this apparatus reference may be had to the Ostline Patent No. 2,678,353.

Before describing the operation of the system, it should be noted that each of the subscriber substation telephone instruments includes the usual hand set having a transmitter and a receiver, a ringer and a calling device or dial. The calling device provided at each of the private subscriber substations, at each pay station, and at each first party substation on a five party line is of conventional construction and arrangement; while the calling device provided at each second, third, fourth and fifth party subscriber substation on a party line is of the construction and arrangement of that disclosed in the Ostline Patent No. 2,410,520, granted November 5, 1946. Thus, each of the party subscriber substations provided with the special dial of the type shown in the above mentioned Ostline patent includes a special impulsing cam in addition to the regular impulse transmitting springs. The impulsing springs normally operate in a conventional manner in response to the return movement of the finger wheel of the dial to transmit a variable number of series of switch controlling impulses in accordance with the finger hole selected on the pull of the dial. Also, the cam spring provided at the special dials are arranged during the return movement of the finger wheel to transmit a fixed number of station identifying ground impulses to identify the particular station that is originating the call. While it has been suggested that the calling device of the type disclosed in the Ostline Patent No. 2,410,520 be utilized at the party subscriber substation to identify the calling station, it will be appreciated that any dial having facilities for transmitting station identifying ground pulses, in addition to the usual loop pulses, may be utilized to identify the calling station as digits of a number are being dialed.

In order to describe the operation of the system disclosed in Figs. 2 to 10, inclusive, and schematically illustrated by the trunking diagram of Fig. 1, it will be assumed that a call is initiated by a subscriber at substation TS1–3, shown in Fig. 2. As soon as the calling subscriber removes his receiver, the usual loop circuit, including the line conductors XC402 and XC403, is completed for operating the line circuit X405. The line circuit X405 functions in a conventional manner to initiate the operation of the distributor X442, and it marks the terminals of the calling subscriber line in the bank contacts accessible to a group of line finders, including the line finder X440. It will be assumed that the distributor X442, by means of its rotary switch X441, selects the line finder X440 and as a result thereof the line finder actuates its associated wipers first in a vertical direction and then in a rotary direction, in the well known manner, to find and connect with the contacts marked by the calling line circuit X405. When the calling line is found by the line finder X440, the loop circuit from the calling station is extended through the line circuit X405 and the line finder X440 to initiate operation of the primary selector X500. As soon as the primary selector X500 is thus seized, it operates the director hunter X450 so that it will search for an idle director, such as the director X300 shown in Fig. 1. As soon as the idle director is found, the calling subscriber loop circuit is disconnected from the primary selector X500 and transferred to the director X300 that has been found by the director hunter X450. For convenience in describing the director X300, the various component parts thereof, including the controller X600, the miscellaneous relay X1100, call register X1500, call recorder X2000 and the coder X1800 have been shown as separate units.

When the calling subscriber loop circuit is transferred to the director, circuits are extended through the wipers X456 and X457 of the director hunter X450 to the conductors XC471 and XC472 extending to Fig. 3 so that one circuit path is completed by way of the contacts X1115, the lower winding of the line relay XR1130, contacts X1156, resistor X1158, and battery and so that another circuit path is completed by way of the contacts X1113, X1144 and the winding of the line test relay XR1120, to ground. The line test relay XR1120 and the line relay XR1130 operate over the above mentioned calling subscriber loop circuit. At its contacts X1133, the line relay XR1130 completes an obvious circuit for operating the hold relay XR1140 and the latter relay completes, at its contacts X1141 a circuit for extending ground potential over the conductor XC1137 to Fig. 2 in order to operate the seizure relay R750 in the controller X600. Also the relay XR1140, at its contacts X1146, disconnects the lower winding of the line test relay R1120 from the conductor XC472 and it connects the latter conductor to ground potential at contacts X1154. At this time the line relays X1130 will be held in the loop circuit including the calling subscriber line from ground at contacts X1154 to battery potential by way of the contacts X1156.

In the controller X600 portion of the director, the operation of the seizure relay R750 applies certain holding grounds to the various component parts of the director X300, including the application of a holding ground at contacts X751 to the conductor XC787 extending to the coder X1800 (Fig. 10) portion of the director X300.

Also at this time the controller X600 portion of the director performs a class test to register the particular class of the calling subscriber line. As previously noted, the calling station is connected to a party line and, consequently, the controller X600 will, upon testing the line, register the class 2 indication therein. The particular class of the calling line is in turn transferred from the controller X600 to the class relays (not shown) in the translator X1300 (Fig. 6) over the conductor XC682 from the controller X600. The conductors XC681 or XC683 will be grounded in the event that either a class 1 or a class 3 calling line has been registered in the controller X600 during the class test of the calling subscriber line.

As a further result of the class test by the controller X600, ground potential is extended to the conductor XC1123 (Fig. 3) in order to momentarily operate the test control relay XR1110. This relay upon operating, at its various contacts disconnects the loop circuit of the calling subscriber line from the previously mentioned circuit for the line relay XR1130 and connects it to the multiple circuit including the upper winding of the line test relay XR1120. This connection of the upper winding of the line test relay XR1120 to the calling line is for the purpose of determining whether or not the calling line has a false ground condition thereon. If such a condition is encountered and it is of sufficient magnitude to operate the line test relay XR1120, the relay will operate and complete, at its contacts X1121, a circuit including contacts X1116 and conductor XC1167 extending to Fig. 10 in order to operate the relay XR1810. The last mentioned relay, if operated, will lock itself and thus register the fact that the calling subscriber line has a false ground condition thereon. If the line relay XR1120 does not operate, it will indicate that no false ground condition exists on the calling line. Shortly thereafter, the controller X600 will cause the restoration of the test control relay XR1110 in order to reconnect the line relay XR1130 to the calling subscriber loop circuit and to disconnect the line test relay XR1120 therefrom. After the above described class and grounded line tests have been made of the calling subscriber line by the controller X600 portion of the director, a dial tone signal will be transmitted to the calling subscriber in a conventional manner to indicate that the digits of the called subscriber number may be dialed.

*Dialing the called number*

When the calling subscriber hears the tone signal, he may dial the seven digit directory number of the desired called subscriber station. When the first digit (letter) is dialed by the calling subscriber, the line relay XR1130 (Fig. 3) will respond in the well known manner and it will register this digit in the first code register X1520 in the call register X1500 (Figs. 7 and 8). More specifically, in response to the first interruption of the loop circuit by the first impulse, the line relay XR1130 will momentarily restore to normal and, at its contacts X1131, will extend ground potential by way of the contacts X1142, conductor XC1138 extending to the controller X600 (Fig. 2) and then by way of the conductor XC717 extending to Fig. 7, wiper X1514 in engagement with the contact terminating the conductor XC1551, and the winding of the magnet XRM1521, to battery. Certain operations are performed by the controller X600 during the time pulses are transmitted by the line relay XR1130 over the above traced circuit to the magnet XRM1521 so that the magnet XRM1511 of the receive sequence switch 1510 (Fig. 7) is retained energized. The magnet XRM1521 operates and restores in response to each impulse of a series of impulses constituting the first digit (letter) of the called office code, in order to advance its wipers X1523 to X1526, inclusive, a corresponding number of steps to register the corresponding digit therein.

During the interdigital pause between the first digit and the second digit, the line relay XR1130 remains in its operated position so that the controller 600 portion of the director will interrupt the circuit for the magnet XRM1511. As soon as the magnet restores to normal, it will advance its wipers X1513 to X1516, inclusive, into engagement with the next set of contacts in the associated contact banks. The wiper X1514 will thus transfer the pulsing circuit from the magnet XRM1521 to the magnet XRM1531. Thus, impulses of the second digit dialed by the calling subscriber will be transmitted to the magnet XRM1531 and its wipers X1533 to X1536 will be advanced to register the corresponding digit in the second office code register X1530.

During the interdigital pause between the second and third digit, the magnet XRM1511 of the receive sequence switch X1510 will again restore to normal and will advance its wipers one step to transfer the impulsing circuit including the wiper X1514 from the magnet XRM1531 to the magnet XRM1541 of the third office code register X1540. The third digit dialed by the calling subscriber, which is the third office code digit, will be registered in the third office code register X1540 in the same manner as has been previously explained. The last four digits of the call subscriber number upon being dialed by the calling subscriber will be registered respectively in the first, second, third and fourth numerical register X1610, X1620, X1630 and X1640 as the receive sequence switch X1510 advances its wipers over the contacts accessible to the wiper X1514 and terminating the conductors XC1554 to XC1557, inclusive. In this manner the seven digits of a called number dialed by a calling subscriber will be registered respectively in the seven registers of the call register X1500. Each of the above noted registers is arranged so that the associated wipers will be advanced step-by-step in a counterclockwise direction a number of steps corresponding to the number of impulses in the digit transmitted thereto.

In the above description, it was pointed out that the wipers of the receive sequence switch X1510 are advanced one step after each digit is registered in the respective registers X1520, X1530, X1540, X1610, X1620, X1630 and X1640. At the end of the first digit, the wipers X1513 to X1516, inclusive, are moved into engagement with the second set of contacts. The wiper X1514 thereby preparing the impulsing circuit for the rotary magnet of the register X1530 and the wiper X1515 engaging the contact terminating the conductor XC1231. At the present time, the conductor XC794, which is connected to the wiper X1515 is grounded at the contacts X757 on the operated seizure relay XR750 in the controller X600 portion of the director and this ground potential is now extended by way of the conductor XC1231 extending to Fig. 3 in order to complete an operating circuit for the party test relay XR1150 and for completing a multiple operating circuit for the lower winding of the party line relay XR1160. Therefore, the relay XR1150 is operated during the interdigital pause between the dialing of the first digit and the second digit by the calling subscriber.

As soon as the party test relay XR1150 operates, it closes its "X" contacts X1151 before the "Y" contacts X1152 are open in order to provide a momentary holding circuit for the upper winding of the line relay XR1130. The "X" contacts X1151 are adjusted so that they are first to close upon operation of the relay and the "Y" contacts X1152 are adjusted so that they are the last to open. At its contacts X1154 and X1156, the relay XR1150 disconnects the ground and battery potentials from the calling subscriber loop circuit, and, at its contacts X1153 and X1155, it connects the calling subscriber loop to a circuit including the upper winding of the party line relay XR1160 and the 48 volt auxiliary battery X1165 and the resistor X1159. The relay XR1160 may be of the type disclosed in the Pye Patent No. 1,673,884, granted June 19, 1928, and it is arranged to respond to the station identifying ground impulses transmitted by the special calling device provided at the previously noted party substation on the party line.

If the calling party is provided with one of the conventional dials previously noted, then the party line relay XR1160 will not operate during the dialing of the second digit but the line relay XR1130 will respond in the usual manner to the dialed impulses. However, if the calling subscriber station is provided with a special dial, both the line relay XR1130 and the party line relay XR1160 will respond, the former to the conventional loop impulses and the latter to the station identifying ground impulses transmitted by the return movement of the dial. Each time the line relay XR1130 restores, it will complete, at its contacts X1131, the previously described circuit whereby the impulses of the second dialed digit are registered in the second office code register X1530. The party line relay XR1160 in response to each operation thereof will transmit a ground impulse over the conductor XC1162 extending to the call recorder X2000 (Fig. 6) to register each one of the ground pulses therein. It should be noted, however, that the line relay XR1130, at its contacts X1131, may also transmit ground pulses by way of the contacts X1142 and the conductor XC1163 extending to the call recorder X2000 (Fig. 6) so that the latter circuit is jointly controlled by pulses repeated by the selective operation of the party line relay XR1160 and the line relay XR1130. In this manner, the identity of the particular station on a calling party line is registered in the call recorder X2000.

At the end of the dialing of the second called office code digit by the calling subscriber, the receive sequence switch X1510 will advance its wipers an additional step into engagement with the third set of contacts in the associated contact banks and as a result thereof, it will interrupt the previously mentioned circuit including the conductor XC1231 extending to Fig. 3 so that the party test relay XR1150 will now restore to normal. The latter relay upon restoring will disconnect the party line relay XR1160 from the calling subscriber loop circuit and it will recomplete the previously traced circuit for the line relay XR1130. Thus, it will be understood that it is only during the dialing of the second digit that the party line relay XR1160 is included in the calling subscriber loop circuit so that the ground pulses transmitted by a special dial at a party line substation will be registered in the call recorder X2000. All other digits dialed by the calling subscriber will only control the line relay XR1130.

The third digit dialed by the calling subscriber will be registered in the third office code register X1540, as previously described, and immediately thereafter the receive sequence switch X1510 will advance its wipers into engagement with the fourth set of contacts in the associated contact banks. Consequently, the wiper X1515 will now engage the contact terminating the conductor XC891. Also the wiper X1514 will engage the contact terminating the conductor XC1554 so that the pulsing circuit is prepared whereby the fourth dialed digit is registered in the first numeral register X1610. During the interdigital pause between the dialing of the third and fourth digits the ground potential applied to the wiper X1515 will now be extended by way of the conductor XC891 to the controller X600 (Fig. 2) in order to complete a circuit, including contacts X811, for operating the assigner start relay XR640. The relay XR640 now operates in order to cause the translator assigner X1000 (Fig. 2) to find the particular calling director X300 being utilized in the present call and to associate the decodel 400 (Fig. 4), the code detecting circuit 500 (Fig. 5) and the common translator X1300 (Fig. 6) with the particular calling director.

It may be well to mention at this time, however, that if the called office code registered in the first, second and third office code registers X1520, X1530 and X1540 is that of the same exchange in which the calling subscriber is located, then the wipers X1526, X1536 and X1546 of the above noted registers, will control the controller X600 portion of the director to disconnect the same from the primary selector X500 utilized in the present connection. In other words, the registration in the call register X1500 of the office code that is the same as the office code of the calling subscriber will cause the automatic disconnection of the director from the present connection so that the last four numerical digits dialed by the calling subscriber will directly control local switches to complete the telephone connection to a call subscriber located in the same exchange as the calling subscriber. Thus, the released director will immediately become available for use in establishing other telephone connections.

Continuing with the description of operation of the apparatus and assuming that the registered called office code is that of a remote called exchange, it will be seen that as a result of the operation of the assigner start relay XR640, at its contacts X643 and X641, it removes ground potential from the conductor XC685 which terminates in a bank contact accessible to the wiper X1002 of the translator assigner X1000. This ground potential is normally maintained on this conductor to mark the controller X600 busy to the translator assigner X1000 so that the assigner will not attempt to connect with the controller X600 until the busy marking ground potential is removed from the conductor XC685.

At this time, it may be well to mention the fact that the translator assigner X1000 is provided with a rotary switch having the wipers X1001 to X1003, inclusive, and associated bank contacts which terminate conductors extending individually to each of the directors in the exchange. It may be assumed that these wipers have access to at least fifty directors although any number of directors may be accessible to the translator assigner X1000 depending upon the amount of traffic and the holding time of the various directors in completing different telephone connections. In the present system, however, the contacts accessible to the wipers X1003 have been multipled together to terminate the conductor XC1070 which extends to the code detecting circuit 500 of Fig. 5. In the prior systems, previously noted, the contacts accessible to the wiper X1003 terminated individual conductors corresponding to the conductor XC1070 in order to control a Strowger switch that was individual to the calling director.

As a further result of the operation of the assigner start relay XR640, at its contacts X644, it applies ground potential to the start conductor XC686 thereby initiating the operation of the assigner X1000 whereby its wipers X1001 to X1003, inclusive, will be advanced step-by-step over the associated contact banks to search for the calling director, which is now marked as calling by the connection of the assigner test relay XR650 to the bank contact accessible to the wiper X1002. Since all other directors have, at the present time, direct ground potential applied to the conductors corresponding to the conductor XC685, such directors will be marked busy to the translator assigner X1000. Other operations performed under control of the assigner start relay XR640 are described in greater detail in the prior Ostline Patents No. 2,678,353 and No. 2,740,836.

In the translator assigner X1000, the application of ground potential to the start conductor XC686 will cause the assigner to rotate its wipers to find the calling director which is marked by the resistance ground potential on the conductor XC685. When this director is found, further stepping of the wipers X1001 to X1003, inclusive, is terminated and a circuit is completed by way of the wiper X1002, conductor XC685, contacts X642 and the winding of the assigner test relay XR650 in the controller X600 portion of the director. The assigner test relay XR650 now operates and completes, at its contacts X651, a circuit for the upper winding of the translation failure relay XR660 and the conductor XC684 extending to the translator assigner X1000. This circuit operates a director hold relay (not shown) in the translator assigner but due to the high resistance of the relay XR660, it does not operate at this time. The director hold relay in the translator assigner X1000, however, completes a circuit whereby ground potential is extended by way of the contacts X1062, wiper X1003, conductor XC1070 extending to Fig. 5, whereby the ground potential is rendered available to mark certain conductors in the code detecting circuit 500 depending upon the operated condition of one of the units relay R550 to R559, inclusive.

As a further result of the operation of the assigner test relay XR650, at its contacts X652, it applies ground potential to one of the class marking conductors XC681 to XC683 depending upon the class of the calling line that was previously determined by the controller X600. The conductors XC681 to XC683, inclusive, extend to Fig. 6 where they terminate in the class relays (not shown) in the translator X1300.

The assigner test relay XR650, at its contacts X653, applies ground potential by way of the conductor XC679 in order to operate the connect relay R450 (Fig. 4) in the decodel 400 and to operate connect relay XR1710 (Fig. 9) in the translator connector X1700. It may be well to mention at this time, that the connect relay R450 and the connect relay XR1710 are individual to the particular director being utilized in the present call. The various contacts on the connect relay R450 are multipled to each of the other directors of the system so that whenever one of the other directors is calling, the associated connect relay will be operated to connect that calling director to the decodel 400. The relay XR1710 is also individual to the instant director, but it should be understood that each of the remaining directors in the system is provided with a similar relay so that the conductors multiply connected to the contacts of the associated relays will connect the particular calling director to the common translator X1300.

At the present time, the circuits and apparatus involved in the present call are in a condition to transfer the digits of the called office code registered in the first, second and third code registers X1520, X1530 and X1540 in the call register X1500 to the decodel 400 (Fig. 4) so that a particular translate relay in the translator X1300 will be operated. The particular selected translate relay will in turn automatically translate the three digits of the called office code into appropriate routing digits and other selective controls and to register this information in the coder X1800 (Fig. 10) portion of the particular calling director.

The manner in which the foregoing translation is accomplished will now be described.

Referring now to the call register X1500 (Figs. 7 and 8) it will be recalled that the foregoing operations, whereby the translator assigner X1000 was controlled to associate the calling director with the decodel 400, the code detecting circuit 500 and the common translator X1300, occurred as soon as the third digit of the called office code was registered in the third office code register X1540. At this time the wiper X1515 of the receive sequence switch X1510 engaged the fourth contact in the associated contact bank terminating the conductor XC891 extending to the controller X600 portion of the director. The calling subscriber will continue to dial the remaining four numerical digits of the call subscriber number and they will be registered respectively in the first, second, third and fourth numerical registers X1610, X1620, X1630 and X1640 in a conventional manner.

In the first office code register X1520, the wipers X1523 to X1526, inclusive, will be standing in engagement with the particular contact in the associated contact banks corresponding to the value of the first digit dialed by the calling subscriber. The contacts accessible to the wipers X1524 and X1525 terminate four marking conductors WXYZ21 which are marked in code form in accordance with the value of the digit registered. Corresponding marking conductors WXYZ22, WXYZ23, WXYZ24, WXYZ25, WXYZ26 and WXYZ27 are provided in each of the remaining registers so that the digits registered in the respective registers are marked in code form in bank contacts (not shown) of a send sequence switch X1650. This switch will be operated at an appropriate time to transmit, in conjunction with the send switch X1660, impulses for controlling the switching apparatus of the system. It should also be noted that the above marking conductors WXYZ21 are multiply connected to marking conductors HW, HX, HY, HZ extending to Fig. 4 where they terminate in the respective contacts 451W, X, Y and Z. The WXYZ22 marking conductors are multiply connected to the marking conductors TW, TX, TY and TZ extending to Fig. 4 where they terminate respectively in the contacts 452W, X, Y and Z. Finally, the WXYZ23 marking conductors are multiply connected to the marking conductors UW, UX, UY and UZ extending to Fig. 4 where they terminate respectively in the contacts 453W, X, Y and Z. In view of the foregoing, it should be understood that the three digits registered respectively in the first, second and third office code registers X1520, X1530 and X1540 are marked in code form on the marking conductors WXYZ21, WXYZ22 and WXYZ23 and they are also marked in the associated marking conductors extending to the decodel 400 of Fig. 4.

As soon as the connect relay R450 operates, as previously described, the digits marked in code form on the conductor terminating on the contacts on the relay will control the operation of the hundreds, tens and units registers 401 to 403, inclusive, in the decodel 400. The register relays of the units register 403 have been shown and are designated R410, R420, R430 and R440. These relays are provided with sets of contact springs arranged in pyramid form, so that by operating the relays in certain combinations, or individually, any one of ten conductors, corresponding to the digits 1 to 10, may be selected and marked depending upon the value of the digits marked in code form by the operated condition of the relays. The same sets of relays are provided in the hundreds and tens registers 401 and 402 to translate the code form of the digit into the decimal or numerical form thereof in the same manner as is shown for the units register 403.

In view of the foregoing, it will be understood that each of the cables C460, C470 and C480 includes ten marking conductors corresponding respectively to the digits 1 to 0, inclusive. The ten marking conductors in the cable C480 terminate respectively in ten (10) units relays R550 to R559, inclusive. Any one of the foregoing relays may be operated to close its associated make contact and connect the ground potential on the conductor XC1070 to any one of ten different marking conductors in the cable C570. The ten conductors in the cable C570 are multiply connected to ten sets of make contacts provided each of ten (10) different tens relays, such as R520. The 10 tens relays are respectively connected to the ten conductors in the cable C470 so that the relay in the code detecting circuit 500 corresponding to the digit registered in the tens register 402 will be operated. Only three of the tens relays R520, R530 and R540 have been shown but it should be understood that there are 10 such relays and that each relay is provided with ten make contacts connected to the ten conductors in the cable C570. The code detecting circuit 500 also includes ten (10) hundreds relays, such as R510, and each relay is provided with 100 make contacts. Therefore, the 10 conductors in the cable C460 are respectively connected to 10 hundreds relays, such as R510, so that the relays R510, so that the digit registered in the hundreds register 401 will operate the corresponding hundreds relay, such as R510, in the code detecting circuit 500. As illustrated in Fig. 5, the relay R510 is provided with 100 make contacts that terminate the 10 sets of 10 conductors on the 10 tens relays. It will be apparent to those skilled in the art, however, that the hundreds relays, such as R510, instead of being a single relay having 100 make contacts, may instead be 10 individual relays each having 10 make contacts or any other combination whereby 100 contacts can be simultaneously closed. In addition to the foregoing, the 100 conductors in the cable C580 that terminate in the 100 make contacts on the relay R510 are also multiply connected to the 100 corresponding make contacts on each of the remaining 9 hundreds relays.

In view of the foregoing, it is apparent that the 10 hundreds relays, such as R510 each having 100 make contacts will provide a total 1000 individual conductors which will terminate respectively in the terminal block XTB1240. Therefore, the registration of any one of 1000 different three digit office codes in the hundreds, tens, and units registers 401 to 403, inclusive, will control the hundreds, tens and units relay in the code detecting circuit 500 to select a particular one of the conductors out of the 1000 conductors terminating in the terminal block XTB1240. This will provide a single control conductor extending to the common translator X1300 to operate the particular translate relay corresponding to the three digit called office code registered in the decodel 400.

There is an additional point that should be considered in connection with the 1000 conductors extending to the common translator X1300 by way of the terminal blocks XTB1240 and XTB1250. This point concerns the three different class conductors XC681 and XC683, inclusive, for operating respectively three different class relays. Thus, if each class conductor, such as XC681, will operate a different class relay having 1000 make contacts thereon, a total of 3000 conductors may be selected individually corresponding to 3000 different translate relays in the translator X1300. The selective operation of one of the three class control relays will select one of the three groups of the 1000 conductors.

The foregoing system, except for the modifications of the call register X1500 and the new apparatus including the decodel 400 and the code detecting circuit 500, is fully described and disclosed in the prior Ostline Patents Nos. 2,768,353 and 2,740,836.

For the purpose of this description, it will be assumed that the routing digits required to extend a connection from a calling subscriber in the FLorida 3 exchange to a called subscriber in the EMpire 1 exchange are the digits 4 and 8. Consequently, it will also be assumed that the digits 361, corresponding to the letters EM and the digit 1 identifying the EMpire 1 exchange, are registered respectively in the first, second and third office code register X1520, X1530 and X1540. The digits 361 will be respectively marked on the code marking conductor WXYZ21, WXYZ22, and WXYZ23 extending to the send sequence switch X1650 and they will also be marked in the hundreds, tens and units registers 401, 402 and 403 in the decodel 400.

The hundreds register 401 having the hundreds digit 3 registered therein will complete the operating circuit for the hundreds relay, such as R510, in the third hundreds group. The tens register 402 will have the digit 6 registered therein and will, consequently, complete the operating circuit to the tens relay, such as R520, in the sixth tens group. Finally, the units digit register 401 having the digit 1 registered therein will complete the operating circuit for the units relay R550.

The code markings employed in the present telephone system is sometimes referred to as a WXYZ code wherein any digit from 1 to 9, inclusive, and 0 may be registered and transmitted by operating or marking any one or any two of four WXYZ relays or conductors in accordance with the following code:

| Digit: | Code |
| --- | --- |
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

Since the digit 1 is registered in the units register 403, the W relay R440 and the X relay R430 will be operated. At the contacts 441 and 431 of these operated relays a circuit is completed to ground the conductor 1 in the cable C480 and thereby operate the units relay R550 in the code detecting circuit 500. The register relays in the hundreds register 401 and in the tens register 402 are exactly the same and operate in the same manner as the register relays in the units register 403.

As a result of the operation of the previously noted hundreds, tens and units relays in the code detecting circuit 500, the ground potential on the conductor XC1070 will complete a circuit through the contacts 560 to a conductor 1 in the cable C570, then through a make contact on the operated tens relay (not shown) in the sixth group to the sixty first conductor (not shown) and then through a make contact on the operated hundreds relay (not shown) in the 300 group to the terminal 361 on the terminal block XTB1240. This terminal will be jumpered by the jumper J361 to another terminal on the adjacent terminal block XTB1250 terminating a conductor extending by way of the class relay (not shown) in the class relays 613 to a particular translate relay, such as the relay XR1401. The selected translate relay will now operate and it will translate the called office code digits 361 of the EMpire 1 exchange into, for example, two routing digits 4 and 8. The translate relay XR1401 shown in the translator X1300 (Fig. 6) may be exactly the same as the relay R1410 shown in Fig. 14 of the Ostline Patent No. 2,678,353. As soon as the above noted translate relay operates, it closes its various contacts thereby to mark the marking conductors in the cable C640 extending to the different contacts on the operated connect relay XR1710 (Fig. 9) in accordance with the information permanently registered in the operated translate relay XR1401.

Referring now to Figs. 9 and 10, it will be understood that when the above noted translate relay operates, it will ground the X11 and Y11 conductors in the cable C640 in order to complete circuits for operating the X11 and Y11 register relays (not shown) to register the digit 4 in the first routing register of the coder X1800. These relays will lock themselves in their operated position by way of the conductor XC787A, contacts X1821 and the conductor XC787 extending to the controller X600 (Fig. 2) where it is grounded at the contacts X751 on the operated seizure relay XR750. Also, the operated X11 and Y11 relays in the first route register, will apply ground potential to the conductor XC884 in order to operate the translation complete relay XR810 in the controller X600. Although the above description includes the transfer of one routing digit (4) from the operated translate relay XR1401 in the translator X1300 to the first routing register of the coder X1800, it should be understood that all of the information that is permanently wired or registered in the operated translate relay is simultaneously transferred to the coder X1800. Consequently, the second routing digit 8 permanently registered in the operated translate relay will also be transferred to the second route register in the coder X1800 by the application of the marking ground potential to the X12 code marking conductor. This will operate the X12 register relay (not shown) in the second route register of the coder X1800 to register, in code form, the digit 8. This relay will also lock itself in its operated position to the grounded conductor XC787. Since only two route digits (4 and 8) are registered in the coder X1800, the remaining four route registers will remain in their restored position. Accordingly, it will be appreciated that as many as six routing digits may be translated as a result of the registration of three called office code digits in the call register X1500.

The four WXYZ17 code marking conductors are provided to indicate the units digit of the rate of charge for the call completed between a calling subscriber in the FLorida 3 exchange and a called subscriber in any other exchange. In the present call, it will be assumed that the charge rate for the call between the FLorida 3 exchange and the EMpire 1 exchange is the rate 01 and, consequently, the W17 and X17 code marking conductors are grounded by the operated translate relay XR1401 to register the units digit 1 in the coder X1800. The operated W17 and X17 register relays will lock in their operated position in the manner previously explained.

The TA, TB, TC and TD code marking conductors are connected respectively to the control relays XR1890, XR1885, XR1880 and XR1875. These relays may be individually operated, or they may be operated in various combinations in order to selectively determine the operation of the send sequence switch X1650 in the call register X1500 (Figs. 7 and 8) of the director. The send sequence switch X1650, as is explained in detail in the Ostline Patent No. 2,678,353, is arranged so that it will first select each of the route registers in the coder X1800 to successively render these registers effective so that the send switch X1660 will transmit impulses corresponding to the route digits to control the setting-up of the connection. Thereafter, the send sequence switch X1650 normally renders each of the office code registers and then the numerical registers in the call register X1500 effective one after another to mark the send switch X1660 so that all of the digits registered therein by the calling subscriber are successively transmitted to complete the connection to the desired called station. However, the above mentioned control relays XR1890, XR1885, XR1880 and XR1875 may be operated individually or in combination, as previously noted, so that the send sequence switch X1650 may be selectively controlled to skip predetermined ones of the office code and numerical registers in the call register X1500.

In order to describe the various combinations which may be utilized in connection with any telephone call, the different control relays will be considered individually. For example, with the TA relay XR1890 in its operated position, will control the send sequence switch X1650 to select all seven of the office and numerical registers in the call register X1500 one after another so that the send switch X1660 will transmit impulses corresponding to each of the digits registered to the switching appatatus of the telephone system to set up the connection. These digits, however, will be transmitted following the transmission of each of the routing digits that have been registered in the route registers of the coder X1800. The foregoing operations are accomplished by the TA control relay X1890 by the opening of all of the break contacts thereon, included in the circuits of the skip 17 conductor XC1837, skip 18 conductor XC1838, and skip 19 conductor XC1839. These conductors correspond respectively to the first, second and third office registers X1520, X1530 and X1540. The send sequence switch X1650 in its operation will sequentially apply ground potential to the above mentioned conductors and if the relay XR1890 is in its operated condition, the ground potential can not be forwarded to the skip common conductor XC1831 in order to control the send sequence switch X1650 to skip the corresponding office code register. The remaining four skip conductors, skip 20 to skip 23, inclusive, designated XC1840 to XC1843, inclusive, correspond respectively to the four numerical registers in the call register X1500 and whenever a circuit is completed from ground on any one of the above mentioned conductors to the skip common conductor XC1831, the corresponding numerical register will be skipped so that the digit registered therein will not be transmitted by the send switch X1650. With the foregoing operations in mind, it is apparent that whenever the TA control relay XR1890 is operated, the conductor XC1837 to XC1839 are disconnected from the skip common conductor XC1831 so that the digits registered in the three office code registers corresponding to the above noted conductors will be transmitted.

If the TB control relay XR1885 is the only one of the four control relays that is operated, then the skip 19 conductor XC1839 will be disconnected from the skip common conductor XC1831 so that the send switch X1660 will now be controlled to skip the digits registered in the first and second office code registers, to transmit the digit registered in the third office code register and then to transmit the four digits registered respectively in the four numerical registers of the call register X1500.

If the TC control relay is the only one of the four control relays that is operated, the send sequence switch X1650 will be controlled so that it will skip the digits registered in the first, second and third office code registers; it will then transmit the first, second and third digits registered in the corresponding numerical registers; and it will then skip the digit registered in the fourth numerical register. Normally, the TC control relay XR1880 will be operated in combination with the TA control relay XR1890 so that the director will properly handle six digit call numbers that have been registered in the call register X1500. When the TA control relay and the TC control relay VR1890 and XR1880 are both operated, the director will skip the first and seventh and will transmit the second to the fifth digits registered in the call register X1500 after the routing digits registered in the coder X1800 have been transmitted.

If the TD control relay XR1875 is the only operated one of the four control relays, it will prevent the send sequence switch X1650 and the send switch X1600 in the director from transmitting any of the digits that have been registered in the office code and numerical registers in the call register X1500. Consequently, only the digits registered in the route registers of the coder X1800 will then be transmitted by the director.

If the TA and TD control relays XR1890 and XR1875 are in their operated positions and the remaining two control relays are restored, the director will transmit the three office code digits and then skip the last four numerical digits registered in the call register X1500.

If the TB and TC control relays XR1885 and XR1890 are operated and the remaining two control relays are restored, the dierctor will skip the first and second office code digits, then transmit the third office code digit, then transmit the three numerical digits, and finally skip the last numerical digit registered in the call register X1500.

If the TB and TD control relays XR1885 and XR1875 are operated and the remaining two control relays are restored, the director will skip the first and second office code digits, then transmit the third office code digit, and then skip all of the remaining digits registered in the call register X1500.

If the TA, TC and TD control relays XR1890, XR1880 and XR1875 are operated and the TB control relay XR1885 is in its restored position, then the director will skip the first office code digit, transmit the second and third office code digits and then skip the last four numerical digits registered in the call register X1500.

From the foregoing, it is apparent that various route digits to be registered in the routing registers in the coder X1800 depending upon the translation relay that is selected as a result of the registration of the three called office code digits. It is also apparent that the selected translate relay will transfer the routing digits that are permanently wired therein, to the route registers in the coder X1880. It is also apparent that the selected translate relay is permanently wired so that it will operate the control relays in one of the plurality of combinations described above in order to obtain the desired control of the director to transmit the digits registered in the routing register and registered in the registers of the call register X1500 to complete the desired connection.

For the purpose of the present description of operation, it will be assumed that the TB control relay XR1885 is operated by the selected translate relay in the translator X1300 and that the control relay locks itself in its operated position by way of its left-hand make contact to the grounded conductor XC787A.

At the right-hand break contact, the relay XR1885 disconnects the skip 19 conductor XC1839 from the skip conductor XC1831 and thereby controls the director so that after it has first transmitted the routing digits 4 and 8, registered in the route register in the coder X1800 and skipped the remaining route registers, it will skip first two called office code digits registered in the call register X1500, and it will then transmit the remaining five digits registered therein. The reason for skipping the first and second code registers in the call register X1500 is governed by the fact that the TA control relay XR1890 is in its restored position which permits the skip 17 and 18 conductors XC1837 and XC1838 to complete circuits to the skip common conductor XC1831.

It will also be assumed that the particular connection being described is one in which a toll ticketing record must be produced to properly assess the calling subscriber for the call. Therefore, the selected translate relay XR1401 in the translator X1300 is permanently wired so that whenever it is operated, it will apply ground potential to the AB toll conductor extending to the coder X1800 so that a circuit will be completed for controlling the call recorder X2000. This circuit includes the grounded AB toll conductor, a contact on the operated connect relay XR1710 (Fig. 9) contacts X1811 and conductor XC2242 extending to the schematically illustrated call recorder X2000 (Fig. 6). A start relay in the call recorder X2000 will be operated over this circuit to indicate that a record is to be produced containing the items of information pertaining to the telephone connection.

Depending upon whether or not the particular charge rate for the call includes the tens digit 1 or the tens digit 0, the Y18 conductor will either be grounded or not grounded by the operated translate relay XR1401. If it is not grounded, the tens digit of the rate of charge for the call is the digit 0 and if it is grounded the circuit will be completed by way of the contact on the operated connect relay XR1710 (Fig. 9) and the conductor XC2245 extending to the call recorder X2000 (Fig. 6) where it will operate a tens digit rate relay to register the tens digit 1, instead of the tens digit 0 for the rate of the charge.

All of the information that is permanently wired and registered in the selected translate relay XR1401 in the translator X1300 is simultaneously transferred to the coder X1800 in the manner described above and, consequently, the translator X1300, may be disconnected from the particular calling director within a very short interval of time after the selected translate relay is first operated. Thus, the actual holding time of the translator X1300, as well as the decodel 400 and the code detecting circuit 500, by any one director is extremely short. This permits the equipment to be utilized in common by a large plurality of directors. In order to control the disconnection of the decodel 400, the code detecting circuit 500, and the translator X1300, the registration of a digit in the first route register WXYZ11 of the coder X1800 will apply ground potential to the conductor XC884 extending to the controller X600 (Fig. 2) so that it will complete an operating circuit for the translation complete relay XR810. Operation of the latter relay, at its contacts X811, interrupts a point in the previously traced circuit for the assigner start relay XR640, so that the latter relay now restores to normal. At its contacts X641 and X642, the relay XR640 transfers the hold conductor XC685 from the circuit including the winding of the assigner test relay XR650 to a direct ground potential. As soon as the above transfer is made, the translator assigner X1000 is controlled over the conductor XC685 to rotate its wipers X1001 to X1003, inclusive, an additional step in order to disconnect the translator assigner X1000 from the particular director. As a further result of the restoration of the relay XR640, at its contacts X644, it removes ground potential from the start conductor XC686 in order to restore the start relay (not shown) in the assigner X1000.

Incident to the restoration of the assigner test relay XR650, at its contact X652, it removes ground potential from the particular selected class conductor XC681 to XC683, inclusive, in order to restore the particular operated class relay (not shown) in the class relays 613 (Fig. 6). At its contacts X651, it interrupts a point in the circuit for the translation failure relay XR660 so that the latter relay can not be operated from the assigner X1000 after the restoration of the relay XR650. Finally, at its contacts X653, the relay XR650 removes ground potential from the conductor XC679 extending to Fig. 4 in order to restore the connect relay R450 in the decodel 400 and to restore the connect relay XR1710 in the translator connector X1700 (Fig. 9). The restoration of the connect relay R450 disconnects the three sets of four conductors of the decodel 400 from the corresponding marking conductors terminating in the bank contacts of the office code register X1520, X1530 and X1540. The restoration of the connect relay XR1710 disconnects the coder X1800 portion of the particular director from the translator X1300.

From the foregoing description of operation, it will be understood that the translator X1300, the decodel 400, the code detecting circuit 500 and all operated relays therein are now restored to normal and the units of equipment are available for assignment to the exclusive use of another calling director. During the short interval of time that the above equipment is associated with the particular calling director, the information permanently wired or stored in the selected translate relay in the translator X1300 is transferred to the coder X1800.

The translation complete relay XR810, as previously noted, is operated to indicate that the coder X1800 has all of the necessary routing information, to complete the particular connection to the desired called subscriber line in the call exchange. Furthermore, the operation of the relay XR810 caused the disconnection of the decodel 400, the code detecting circuit 500 and the translator X1300 from the particular director. As a further result of the operation of the translation complete relay XR810, it controls the various component parts of the director whereby the send sequence switch X1650 and the send switch X1660 therein transmits impulses corresponding to the digits registered in the routing registers of the coder X1800 and corresponding to the digits that are registered in each of the seven registers in the call register X1500. However, certain of the registers in the call register X1500 may be skipped as determined by the operated and restored conditions of one or more of the TA, TB, TC and TD control relays XR1890, XR1885, XR1880 and XR1875, as has been previously described.

In the present call, it has been assumed that the called office code digits 361 of the EMpire 1 exchange have been registered in the called office code registers of the call register X1500 and that these digits were translated by operation of the decodel 400, the code detecting circuit 500 and the translator X1300, into the routing digits 4 and 8 and that these routing digits are respectively registered in the first WXYZ11 and the second WXYZ12 routing registers in the coder X1800. Therefore, the director will transmit the routing digits 48 registered in the first and second route registers in the coder X1800. It will skip the third to the sixth route registers in the coder X1800, and it will then start to transmit the digits registered respectively in the seven registers of the call register X1500. However, inasmuch as it is assumed that the TB control relay XR1885 is in its operated position, the director in transmitting the digits registered in the call register X1500 will skip the digits 3 and 6 registered in the first and second office code registers, it will transmit the digit 1 registered in the third office code register, and it will then transmit, in succession, the four numerical digits of the called subscriber number registered respectively in the four numerical registers of the call register X1500.

The impulses corresponding to the above mentioned digits are transmitted from the controller X600 portion of the director through the director hunter X450 to the primary selector X500. By referring to the trunking diagram shown in Fig. 1, it will be seen that the first routing digit 4 will control the primary selector X500 to raise its wipers in the fourth level in the associated contact bank and then rotate its wipers over the selected level to search for and connect with an idle ticket repeater, such as X2300. The next routing digit 8 will then control the ticket repeater selector X2700 individually associated with the ticket repeater X2300 so that the selector X2700 will raise its wipers to the eighth level and then rotate the wipers to select the repeater X305 terminating the trunk line extending to the EMpire 1 exchange. The last five digits of the called subscriber directory number are repeated over this connection by the repeater X305 to control the switching apparatus in the called EMpire 1 exchange whereby the connection is completed to the desired called subscriber substation.

After the send switch X1660 in the director has transmitted all of the impulses corresponding to the digits required to complete the connection to the called subscriber line, the director will be released so that it is disconnected from the established connection. However, it should be understood that the director will not automatically release itself unless (1) the call recorder X2000 and the detector X1900 have completed their operations to identify the number of the particular calling subscriber in a FLorida 3 exchange and (2) the items of information pertaining to the telephone connection, including the calling subscriber directory number, the called subscriber directory number, and the rate of charge for the call have been transmitted to and registered in the selected ticket repeater X2300. Thus, the director will be retained connected to the established connection until all of the information has been transmitted and stored in the ticket repeater X2300. In response to the completion of the transmission of the information, the director will then release itself in the manner stated previously.

All of the foregoing operations of the system and the detailed circuits of the various units of equipment utilized in establishing a connection is disclosed and described in the Ostline Patent No. 2,678,353, except for the modifications disclosed herein involving the code switch 1100 (Fig. 3), the call register X1500 (Figs. 7 and 8), the new decodel 400 and code detecting circuit 500 illustrated respectively in Figs. 4 and 5, and the coder X1800 (Fig. 10). All other operations, including the registration of the elapsed time of the conversation and the subsequent recording of all of the items of information stored in the ticket repeater X2300 and the operation of the record producing apparatus, including the tabulator X2800, the ticket tape and record tape punch devices X2968 and X2967, are described in detail in the above noted Ostline Patent No. 2,678,353.

*Local calls to the telephone company official P. A. B. X*

In the present telephone system, the FLorida 3 exchange is included in a network with other exchanges wherein each subscriber substation is identified by a seven digit directory number. Each seven digit directory number includes the first and second letters of the called exchange name, a third digit identifying the number of the exchange having the particular name and four digits identifying the particular substation in the identified exchange. Consequently, it is necessary on each call for the calling subscriber to dial the full compliment of seven digits into the director whereby the latter mechanism will control the switching apparatus to complete the telephone connection. The FLorida 3 exchange illustrated in Fig. 1 is provided with lines extending to the Telephone Company P. A. B. X stations, which stations are identified in the usual manner by a seven digit directory number. Consequently, if any subscriber in the FLorida 3 exchange or in any one of the other exchanges desires to call a particular P. A. B. X station, the corresponding seven digit directory number must be dialed. However, provisions are made in the present exchange equipment to enable local subscribers in the FLorida 3 exchange to extend connections to the official P. A. B. X stations by merely dialing three digits.

To enable local subscribers in the FLorida 3 exchange to dial the official P. A. B. X stations by the dialing of only three digits, the terminals of the P. A. B. X station lines may be identified by three digit numbers, for example, 120, 121 to 129, inclusive, 130, 131 to 139, inclusive, etc., whereas the actual number of the different official P. A. B. X stations may, for example, be FL3-2201 to FL3-2299 and FL3-2200. In other words, the P. A. B. X subscriber stations will be in the 2200 group of connectors in the FLoride 3 exchange.

In dialing the regular seven digit number, for example, FL3-2201 to extend a telephone connection from a local calling subscriber in the FLorida 3 exchange to the official P. A. B. X station having the above mentioned directory number, the dialing and the registration of the digits 353 corresponding to the letters FL and the numeral 3 of the FLorida 3 exchange in the director will cause the seizure of the local switching apparatus in the FLorida 3 exchange, whereby the remaining digits 2201 will complete the connection to the desired official P. A. B. X station.

By referring to Figs. 7 and 8, it will be seen that when the digits 353 are registered respectively in the first, second and third office code registers in the call register X1500, the wiper X1526 and the wiper X1536 will be respectively in engagement with the contacts 3 and 5, whereas, the wiper X1546 will be in engagement with the contact 3. As a result of the foregoing, a circuit will first be completed from ground, by way of wiper X1526, contact 3 in the associated contact bank, conductor XC1564 connected to the terminal block XTB1528, wiper X1536 in engagement with contact 5 in the associated contact bank, conductor XC1565 connected to the terminal block XTB1528 and conductor XC888 extending to a digit local relay (not shown) in the controller X600 portion of the director. The last-mentioned relay operates to prepare the primary selector X500 so that it will be in condition to respond to the third digit dialed by the calling subscriber. As previously noted, the third digit dialed by the calling subscriber is registered in the third office code register X1540 and since the primary selector X500 has been prepared for operation, it will also respond to the third digit to raise its wipers to the third level. In this level the primary selector X500 will select an idle local selector, such as the selector X315. In the meantime, however, the wiper X1546 of the third office code register X1540 will be in engagement with contact 3 in the associated contact bank to complete a circuit by way of the conductor XC1566 on the terminal block XTB1528 and the conductor XC889 to operate a third digit local relay (not shown) in the controller X600 portion of the director to indicate that the third digit dialed by the calling subscriber identifies the present exchange and that the director may be released from the connection. The director upon being released from the connection will interconnect the primary selector X500 to the calling subscriber line so that the last four numerical digits 2201 dialed by the calling subscriber will now respectively control the selector X315, the selector X320 and the connector X325 (which responds to the last two digits 01) to complete the connection to the official P. A. B. X 101. It will be apparent that the translator X1300 and other apparatus required in translating the three digits of a called office code are not utilized in the telephone connections that are completed between local subscribers in the FLorida 3 exchange. The operation of the switching apparatus in the FLorida 3 exchange, whereby the director is released from the connection after office code digits (353) of the FLorida 3 exchange are registered therein and whereby the remaining numerical digits of the called number are dialed directly from the calling subscriber line to the switching apparatus in order to complete a connection to another local subscriber in the FLorida 3 exchange is disclosed and described in detail in the previously noted Ostline Patent No. 2,678,353.

In view of the foregoing description, it will be apparent that the calling subscriber, by dialing the seven digits FL3-2201 of the directory number of the official P. A. B. X 101 will control the switching apparatus to complete the above described telephone connection. In the present system, it is also possible for the calling subscriber to obtain connection with the above mentioned official P. A. B. X station by merely dialing the three digits 101. A calling subscriber in the FLorida 3 exchange by dialing the three digits 101 to extend a connection to the official P. A. B. X 101 having the directory number FL3-2201, will register the digits respectively in the office code registers X1520, X1530, X1540 in the usual manner. As a result of the foregoing, the receive sequence switch X1510 will have moved its wipers into engagement with the contacts 4 terminating the conductor XC891 to complete the previously described circuit for the assigner start relay XR640 (Fig. 2). The assigner start relay will again cause the translator assigner X1000 to find and connect with the particular calling director and it will cause the connection of the decodel 400, the code detecting circuit 500 and common translator X1300 with the director by operating the relay R450 and it will connect the translator to the coder X1800 portion of the director by operating the connect relay XR1710 (Fig. 9) in the manner previously described.

Since the digits 101 have been registered in the call register X1500, they in turn will complete circuits whereby these digits are registered respectively in the hundreds register 401, the tens register 402 and the units register 403 of the decodel 400. The latter registers in turn complete circuits for operating the hundreds relay R510 in accordance with the digit 1, the tens relay R540 in accordance with the tens digit 0 and the units relay R550 in accordance with the units digit 1. These relays operate in the manner previously described herein, whereby a circuit is completed from the grounded conductor XC1070 (Fig. 5) by way of the contacts 560 on the operated units relay R550, the contacts 541 on the operated 0 tens relay R540, contacts 501 on the operated first hundreds relay R510, conductor C101 extending to the terminal block XTB1240, jumper J101 extending to the terminal block XTB1250 and then by way of the class relays 613 (not shown) to operate a translate relay, such as the relay XR1400 in the common translator X1300 (Fig. 6). The operated translate relay XR1400 is permanently wired so that it will mark the WXYZ11, WXYZ12 and WXYZ13 marking conductors in the cable C640 in accordance with the digits 322 respectively. Also, the operated translate relay XR1400 is permanently wired so that it will apply ground potential to the TA, TC and TD marking conductors in the cable C640. Consequently, the digits 322 will respectively be registered in the first, second and third route registers in the coder X1800 and the TA, TC and TD control relays XR1890, XR1880 and XR1875 will also be operated to perform the specific controls in the director previously described.

As a result of the registration of the digit 3 in the first route register (WXYZ11) ground potential is again applied to the conductor XC884 to operate the translation complete relay XR810 in the controller X600 portion of the director in the manner previously described. Consequently, the decodel 400, the code detecting circuit 500 and the translator X1300 will be disconnected from the director so that it may be used in translating office code digits registered in other directors. Also, the operation of the translate complete relay XR810 initiates operation of the director whereby the send sequence switch X1650 and the send switch X1660 cooperate to transmit one after another, the three digits 322 registered in the routing registers of the coder X1800. The first digit 3 transmitted by the director in the above mentioned manner will control the primary selector X500 (Fig. 1) in a conventional manner to raise its wipers to the third level and then to rotate the wipers to select a selector, such as X315. The second digit 2 transmitted by the director will control the selector X315 to raise its wipers to the second level and to rotate its wipers over the selected level to search for and connect with an idle selector, such as the selector X320. The third digit 2 transmitted by the director will now control the selector X320 to raise its wipers to the second level whereupon the wipers will rotate over this level to search for and select an idle connector, such as the connector X325.

The foregoing route registers are selected in the order named by the send sequence switch X1650 and since no digits have been registered in the fourth to the sixth route register, the send sequence switch will automatically skip these registers and move into a position to start transmitting impulses corresponding to the digits that may have been registered in the seven registers of the call register X1500. Inasmuch as the three TA, TC and TD control relays R1890, R1880 and R1875 are now in their operated positions, the sequence switch will be controlled to skip certain of the registers in the call register X1500 and not to skip certain other registers. More specially, the skip 17 conductor XC1837, which corresponds to the first office code register X1520 will have ground potential applied thereto and this ground potential will be extended by way of the right-hand make contact 1884 on the operated TC control relay XR1880 to the skip conductor XC1831 so that the send sequence switch X1650 will skip the first numerical register. Thus, the digit 3 registered in the first office code register will not be transmitted. The send sequence switch X1650 will now apply ground potential to the skip 18 conductor XC1838 but inasmuch as the TA control relay XR1890 is in its operated position, no ground potential will at this time be connected to the skip common conductor XC1831. As a result of the foregoing, the send sequence switch X1650 and the send switch X1660 will cooperate to transmit the impulses corresponding to the digit 0 registered in the second office code register X1530. The impulses of this digit will control the connector X325 to raise its wipers to the tenth level in a conventional manner.

The send sequence switch now applies ground potential to the skip 19 conductor XC1839 and since the TA control relay XR1890 is still in its operated position, ground potential will not be connected at this moment to the skip common conductor XC1831. Accordingly, the digit 1 registered in the third office code register X1540 will now be transmitted by the director to the connector X325 to rotate the wipers over the selected level into engagement with the contacts 1 terminating the line of the official P. A. B. X 101. The send sequence switch now takes an additional step to ground the skip 20 conductor in an attempt to transmit a digit that may be registered in the first numerical register X1610 in the call register X1500. However, it is noted that the TD control relay XR1875 is in its operated position to close the contacts X1876 to X1879, inclusive. The ground potential on the skip 20 conductor X1840 will now be connected to the skip common conductor XC1831 so that any digit that may have been registered in the first numerical register X1610 will be skipped and not transmitted by the director. The same operations occur as the sequence switch sequentially applies ground potential to the skip 21, 22 and 23 conductors XC1841 to XC1843 so that all of the numerical registers will be skipped by the send sequence switch X1650.

The director X600 will now be released and disconnected from the established connection so that the connection is completed between the local subscriber in the FLorida 3 exchange and the official P. A. B. X 101.

From the foregoing, it will be appreciated that the dialing of the three digits 101 by a local subscriber will complete the connection to the official P. A. B. X station having the directory number FL3-2201. Other official P. A. B. X stations are also assigned regular seven digit directory numbers so that they are available to subscribers in other exchanges as well as to local subscribers in the FLorida 3 exchange, and they may also be assigned special three digit numbers, in the manner described above, whereby local subscribers may establish connections with desired official P. A. B. X. stations by merely dialing the appropriate three digit special number.

*Calls using "0" as the first digit*

In certain areas in which toll ticketing apparatus is provided, for example, the Los Angeles Metropolitan area, the single digit 0 is utilized to automatically route telephone connections to an operator position who can then complete the connections on a manual or automatic basis. With this arrangement, the "0" operator may also reverse the charges for the connection by ascertaining from the called subscriber whether or not they will accept the charge for the call. In view of the fact that the single digit "0" is used for operator calls, three digit called office codes starting with the digit "0" could not be used unless some special provision is made in the director to distinguish between the calls in which a single digit "0" is employed and other calls in which the first digit of a three digit office code is also the digit 0.

In the present system, the director is arranged to recognize three digit office codes having the first digit 0 and to complete them on an automatic toll ticketing basis to the called destination. Also, the director is arranged so that it will recognize single digit 0 calls and to route such calls to the 0 operator position without requiring the use of the decodel 400, the code detection circuit 500, and the common translator X1300.

It is also possible with the present invention to have the same exchange identified by two different three-digit office codes. For example, the office code 031 of the ZEnith 1, and the office code 361 of the EMpire 1, may identify the same exchange. Consequently, if it is desired to reverse the charge for the connection, the office code 031 of the ZEnith 1 exchange is dialed instead of the digits 361 of the EMpire 1 office code. With this arrangement, the director apparatus will route the call to the EMpire 1 exchange, when the code 361 of the EMpire 1 or the code 031 of the ZEnith 1 exchange is used. The toll ticketing apparatus in producing the record of the connection will record either the ZEnith 1 called office code or the EMpire 1 office code depending upon the code dialed by the calling subscriber and the ZEnith 1 code will indicate that the charge for the particular connection is to be assessed against the called subscriber station instead of the calling subscriber station. With this arrangement, business establishments in a suburban area may provide the reverse charge facilities for the convenience of their customers so that all calls thereto will be made on a reverse charge basis.

In order to describe the foregoing facilities, it will be assumed that the calling subscriber in the FLorida 3 exchange, for example, the calling subscriber at substation TS-3, has established a connection, in the conventional manner, by way of the line circuit X405, the line finder X440, primary selector X500, director hunter X450, and the miscellaneous relays X1100 (Fig. 3) in the director in manner previously described. It will also be assumed that the calling subscriber has dialed the single digit "0" which is registered, in the manner herein described, in the first office code register X1520 of the call register X1500 portion of the director. The registration of the single digit 0 in the first office code register X1520 will cause all of the wipers thereof to engage the tenth contacts in the associated banks, whereby a circuit is completed by the wiper X1526 through the lower winding of the reverse charge relay R1600 to the pick-up conductor C1603. Battery potential momentarily appears on the pick-up conductor C1603 approximately two seconds before a ground pulse appears on the two second pulse conductor C1604. Thus, from two to four seconds may elapse before a ground pulse will appear on the conductor C1604.

In the present example, it has been assumed that only the single digit 0 has been dialed and, consequently, the receive sequence switch X1510 will have advanced its wipers only one step. Thus, the wiper X1515 will engage the contact terminating the conductor XC1231 to complete a holding circuit for the reverse charge relay R1600 provided the latter relay has been operated. This holding circuit may be traced from the grounded conductor XC794 (normally grounded by the controller X600 portion of the director) wiper X1515, contacts 1601 and the upper winding of the relay R1600, to battery. Within approximately two seconds after the relay R1600 first operates, a ground pulse will appear on the two second pulse conductor C1604 to complete a circuit by way of the contacts 1602, conductor XC1518 extending to Fig. 10, contacts 1859, and the winding of the 0 operator relay XR1850, to battery. The 0 operator relay XR1850 in the coder X1800 (Fig. 10) will immediately operate and lock itself by way of its contacts 1858 to the grounded conductor XC787A. The latter conductor is grounded by the operated seizure relay XR750 (Fig. 2) in the controller X600 portion of the director. Since the 0 operator relay XR1850 performs the same functions and controls that are explained in detail in the prior Ostline Patent No. 2,740,836, the description of its operation will not be repeated herein. It should be understood, however, that the 0 operator relay XR1850 marks the first and second route registers in the coder X1800 in accordance with the digits 5 and 8 respectively, so that the director will transmit the two routing digits 5 and 8 to route the particular connection by way of the primary selector X500 and the special selector X340 (Fig. 1). The primary selector X500 will respond to the digit 5 and the special selector X340 will respond to the digit 8, both transmitted by the director, in order to complete the connection to the 0 operator position. However, before the above mentioned connection is completed, it should be noted that the 0 operator relay XR1850, at its contacts X1856, completes an obvious circuit for operating the TD control relay XR1875. In view of the fact that the TA, TB and TC control relays XR1890, XR1885 and XR1880 are in their restored position and the TD control relay XR1875 is in its operated position, the skip 17 to skip 23 conductors XC1837 to XC1843, inclusive, will be sequentially grounded by the send sequence switch X1650, so that the skip common conductor XC1831 will cause the send sequence switch to skip all of the registers in the call register X1500.

It is noted that the above described operation of the director to route a call to the 0 operator position in response to the dialing of the single digit 0 is similar to the operation described in the Ostline Patent No. 2,740,836. However, in the present arrangement, the reverse charge relay R1600 has been placed in the circuit to introduce a predetermined delay interval before the 0 operator relay XR1850 can be operated. The reason for this delay will be more apparent in connection with a call in which three digit called office code utilizes the digit 0 as a first digit.

The remaining operations of the director in completing the above described connection to the "0" operator position and the release of the director is exactly the same as is explained in the above noted Ostline application Serial No. 205,460 and will not be repeated at this time. It is important to note that the translator assigner X1000, the decodel 400, the code detecting circuit 500, and the translator X1300 are not utilized on "0" operator calls.

*Reverse charge*

As pointed out previously, certain calls may be made to the EMpire 1 exchange on a reverse charge basis by merely substituting the called office code 031 of the ZEnith 1 exchange for the office code 361 of the EMpire 1 exchange. The reversal of charge for the connection is accomplished by recording the exchange name ZEnith 1 instead of the exchange name EMpire 1. The mere fact that the toll ticketing information produced in connection with the telephone call has a ZEnith 1 office code is sufficient indication to the telephone company that the charge for that particular call should be made against the called subscriber substation instead of against the calling subscriber substation as is the usual case. Another point of importance in connection with a call in which the called office code has a first digit 0 is that the director must distinguish between a single digit 0 call that is to be routed to the operator and a three-digit office code having a first digit 0 that must be routed to the exchange identified by the three digit office code.

In order to describe the foregoing facilities provided in the director of the present system, it will be assumed that the calling subscriber in the FLorida 3 exchange makes the same type of call as described above where only a single digit 0 is dialed into the director. The single digit 0 is registered in the first office code register X1520 and no further digits are dialed by the subscriber. As as result thereof, the reverse charge relay R1600 is locked in its operated position so that the call is routed to the 0 operator position. However, if the calling subscriber should continue to dial additional digits so that a three digit called office code is registered in the three office code registers X1520, X1530 and X1540 in the manner previously described, the receive sequence switch X1510 will be positioned to open the locking circuit for the relay R1600 so that the relay will then be in its restored position to prevent the call from being routed to the 0 operator position.

If it is assumed that the office code 031 of the ZEnith 1 exchange is registered in the office code registers of the call register X1500, the above mentioned locking circuit for the upper winding of relay R1600 will be opened in less than two seconds after the relay is first operated by the battery pulse transmitted over the pick-up conductor C1603. The relay R1600 will continue to be operated at spaced intervals by the battery pulse of the conductor C1603 but this battery pulse will be removed from the last mentioned conductor before the two second pulse appears on the conductor C1604. Therefore, the relay R1600 will be in its restored position when the pulse appears on the conductor C1604. This will prevent the 0 operator relay XR1850 in the coder X1800 from being operated even though a first digit 0 of a three digit called office code is registered in the first office code register X1520. More specifically, the wiper X1526 will apply ground potential to the circuit for the lower winding of the relay R1600 in response to the registration of the digit 0. When the battery pulse is received on the conductor C1603, the relay will operate and, at its contacts 1601, it can lock itself in its operated position to the previously described circuit including the wiper X1515 and the grounded conductor XC794. If the second digit is immediately registered in the second office code register X1530, receive sequence switch X1510 will advance its wipers one step to interrupt the holding circuit for the upper winding of relay R1600. The latter relay will continue to operate and restore each time a pick-up pulse is received over the conductor C1603 but since the pick-up pulse on the conductor C1603 is removed therefrom before the two second ground pulse appears on the conductor C1604, the relay R1600 will be in its restored position. The 0 operator relay XR1850 in the coder X1800 can not be operated if one or more digits are registered in the call register X1500 after the digit 0 is registered in the first office code register X1520 therein.

With the digits 031 registered respectively in the office code registers of the call register X1500, the controller X600 portion of the director will be controlled in the manner previously described whereby the digits 031 are registered respectively in the hundreds, tens and units registers 401, 402 and 403 in the decodel 400 (Fig. 4) and these registers in turn will control the corresponding hundreds, tens and units relay in the code detecting circuit 500 so that a particular terminal 031 on the terminal block XTB1240 is selected and marked with a ground potential. This terminal may be connected by way of the jumper J031 to the terminal block XTB1250 to operate, for example, the translate relay XR1401 in the translator X1300. This translate relay may be the same translate relay that is individual to the office code digits 361 of the EMpire 1 exchange. Consequently, the translate relay XR1401 may be operated either as a result of dialing the code digits 361 of the EMpire 1 exchange or the code digits 031 of the ZEnith 1 exchange. The same routing translation is produced for either of the above office codes and these translations are registered in the coder X1800 in the manner previously described so that the proper routing digits may be transmitted by the send sequence switch X1650 and the send switch X1660. In other words, the digits 4 and 8 registered in the routing registers of the coder X1800 are first transmitted. The selected translate relay XR1401 will also be arranged so that it will cause the operation of the TB control relay XR1885. Thus, the first and second code digits 03 of the office code 031 registered in the office code registers of the call register X1500 will not be transmitted. However, the last digit 1 of the office code 031 and the four numerical digits of the called subscriber station in the called exchange (EMpire 1) will be transmitted to complete the connection.

In the above description it is assumed that the registration of the digits 031 of the ZEnith 1 exchange will select the same translate relay XR1401 that is selected whenever the digits 361 of the EMpire 1 exchange are registered. It should be understood, however, that another translate relay may be provided having its terminals permanently wired to control the director to transmit any desired routing digits, as well as certain combinations of the digits registered in the call register X1500.

In any event, the completed connection between the two subscribers will be recorded in the manner previously explained but in the present case in which the ZEnith 1 exchange code is registered as the called exchange of the telephone connection, the corresponding code will be printed or perforated on the toll ticket that is produced as a result of the connection. The information on the toll ticket is usually scanned by billing machines provided in the telephone exchange. These billing machines are arranged so that they will make a charge for the call against a calling subscriber station, which in the present call would be a subscriber in the FLorida 3 exchange. However, the machines may be arranged so that they will sort out calls in which the called exchange is identified as the ZEnith 1 exchange so that such calls will be charged against the called station instead of the calling station. This is possible because the ZEnith 1 called exchange code and the numerical digits of the directory number identify the particular station in the EMpire 1 exchange that has subscribed for the reverse charge service and has agreed to pay for all calls received at the station. It should also be apparent that the station in the EMpire 1 exchange having the reverse charge service may also be called by dialing the regular office code digits 361 of the EMpire 1 exchange. In the latter event, the charge for the call will be made against the calling station in the FLorida 3 exchange instead of against the called station in the EMpire 1 exchange.

While one embodiment of the invention has been disclosed, it will be understood that various modifications may be made therein which are within the true spirit and scope of the invention.

What is claimed is:

1. In a telephone system, a calling line, a first destination identified by a single digit code consisting of a predetermined digit, a second destination identified by a plural digit code consisting of said predetermnied first digit and a plurality of additional digits, switching apparatus operative in a first manner to complete a connection from said calling line to said first destination and operative in a second manner to complete a connection from said calling line to said second destination, means controlled in response to the transmission of said predetermined first digit operating said switching apparatus in a first manner to complete said connection from said calling line to said first destination, and means controlled in response to the transmission of said additional digits immediately following said transmission of said predetermined first digit for preventing said operation of said switching apparatus in said first manner and for operating said switching apparatus in said second manner to complete said connection from said calling line to said second destination.

2. In a telephone system, a calling line, a first destination identified by a single digit code consisting of the digit zero, a second destination identified by a plural digit code having the digit zero as the first digit, switching apparatus for completing a connection from said calling line to said first destination or to said second destination, means controlled in response to the transmission of said single digit code over said calling line for normally operating said switching apparatus to complete a connection from said calling line to said first destination, and means controlled in response to the transmission of said plural digit code having the first digit zero over said calling line for preventing said completion of said last mentioned connection and for operating said switching apparatus to complete a connection from said calling line to said second destination.

3. In a telephone system, a calling line, a first destination identified by a single digit code consisting of the digit zero, a second destination identified by a plural digit code having the digit zero as the first digit, switching apparatus for completing a connection from said calling line to said first destination or to said second destination, time controlled means, means controlled in response to the transmission of said digit zero over said calling line for rendering said time controlled means effective, means controlled by said time controlled means after a determined elapsed time interval for operating said switching apparatus in a first manner to complete a connection from said calling line to said first destination, and means controlled in response to the transmission of the additional digits of said plural digit code before the elapse of said determined time interval following the transmission of said single digit zero for operating said switching apparatus in a second manner to complete a connection from said calling line to said second destination.

4. In a telephone system having a plurality of register senders, a translate relay and a route register included in each of said register senders, a translator common to all of said register senders, means for registering the digits corresponding to the code designation of a called destination in one of said register senders, means controlled in response to the registration of a predetermined single digit of a single digit code designation in said one register sender for first preparing a circuit for selectively operating the associated translate relay in said register sender and for then completing said circuit after an elapsed time interval, means controlled in response to the registration of one or more additional digits of a plural digit code designation having said predetermined digit as a first digit for preventing the completion of said circuit for said associated translate relay in said register sender, means governed in response to the completion of said circuit for said associated translate relay prior to the registration of said additional digits in said register sender for rendering the registration of said additional digits ineffective to prevent completion of said circuit for said associated translate relay, means governed in accordance with the selective control of said associated translate relay for operating said route register to register a translation of said single digit code designation for routing a connection to said called destination corresponding to said single digit code registered in said register sender, and means governed by the registration of said plural digit code designation for selecting said common translator and for controlling said common translator to operate said route register to register a translation of said plural digit code for routing a connection to the called destination corresponding to the plural digit code designation registered in said register sender.

5. A telephone system having a plurality of register senders, a translate relay and a route register included in each of said register senders, a translator common to all of said register senders having a plurality of translating devices therein, means for registering a called station directory number in one of said register senders, means controlled in response to the registration of a single digit directory number for selectively operating said translate relay, means controlled in response to the registration of a plural digit directory number having a first digit corresponding to said single digit directory number for associating said common translator with said register sender and for selectively operating one of said translating devices in said common translator in accordance with certain of the digits in said plural digit directory number, means controlled in response to the selective operation of said translate relay in said register sender or said one translating device in said common translator for registering in the route register of said register sender a translation of said single digit or of said plural digit directory number, and means in said one register sender for selecting a route over which a connection may be completed to the called station identified by the registered directory number in accordance with the translation registered in said route register.

6. In a telephone system having a plurality of register senders, a zero digit translate relay and a route register included in each of said register senders, a translator common to all of said register senders, means for registering the digit or digits corresponding to the code designation of a called destination in one of said register senders, means controlled in response to the registration of the digit zero of a single digit code designation in said one register sender for preparing a circuit for selectively operating said zero digit translate relay in said register sender, means for operating said zero digit translate relay over said prepared circuit after an elapsed time interval, means controlled in response to the registration of one or more additional digits of a plural digit code designation within said elapsed time interval for preventing said operation of said zero digit translate relay in said register sender, means governed in response to said operation of said zero digit translate relay prior to the registration of said additional digits in said register sender for rendering the registration of said additional digit or digits ineffective to prevent said operation of said zero digit translate relay, means governed in accordance with the selective operation of said zero translate relay for operating said route register to register a translation of said single digit code designation in order to route a connection to the called destination corresponding to said single digit code designation registered in said register sender, and means governed by the registration of said plural digit code designation within said elapsed time interval for selecting said common translator and for controlling said common translator to operate said route register to register a translation of said plural digit code designation in order to route a connection to the called destination corresponding to the plural digit code designation registered in said register sender.

7. A telephone system having a plurality of register senders, a zero digit translate relay and a route register included in each of said register senders, a translator common to all of said register senders having a plurality of translating devices therein, means for registering a called station directory number in one of said register senders, means controlled in response to the registration of a single digit zero directory number for selectively operating said zero digit translate relay, means controlled in response to the registration of a plural digit directory number having a first digit zero for associating said common translator with said register sender and for selectively operating one of said translating devices in said common translator in accordance with said first digit zero and at least one additional digit of said plural digit directory number, means controlled in response to the selective operation of said zero digit translate relay in said register sender or said one translating device in said common translator for registering in the route register of said register sender a translation of said single digit zero or of said plural digit directory number, and means in said one register sender for selecting a route over which a connection may be extended to reach the called destination identified by the single digit zero or by the plural digit directory number having a first digit zero registered in said one register sender in accordance with translation registered in said route register.

8. In a telephone system, a calling line, a first destination identified by a single digit code consisting of a predetermined digit, a second destination identified by a first plural digit code consisting of said predetermined first digit and a plurality of additional digits and also identified by a second plural digit code consisting of a different first digit and a plurality of additional digits, switching apparatus operative in a first manner to complete a connection from said calling line to said first destination and operative in a second manner to complete a connection from said calling line to said second destination, means controlled in response to the transmission of said predetermined first digit for operating said switching apparatus in said first manner to complete said connection from said calling line to said first destination, means controlled in response to the transmission of said additional digits of said first plural digit code immediately following said transmission of said predetermined first digit for preventing said operation of said switching apparatus in said first manner and for operating said switching apparatus in said second manner to complete said connection from said calling line to said second destination, and means controlled in response to the transmission of said second plural digit code for operating said switching apparatus in said second manner to complete said connection from said calling line to said second destination.

9. In a telephone system, a calling line, a called first destination identified by a single digit code consisting of the digit zero, a called second destination identified by a first plural digit code having the digit zero as the first digit and also by a second plural digit code having a first digit other than zero, switching apparatus for completing a connection from said calling line to said called first destination and to said called second destination, means controlled in response to the transmission of said single digit code over said calling line for normally operating said switching apparatus in a first manner to complete a connection from said calling line to said first destination, means controlled in response to the transmission of said first plural digit code having the first digit zero over said calling line for preventing said first digit zero from completion of said last-mentioned connection to said first destination and for operating said switching apparatus in a second manner to complete a connection from said calling line to said second destination, and means controlled in response to the transmission of said second plural digit code for operating said switching apparatus in said second manner to complete said connection from said calling line to said second destination.

10. In a telephone system, a calling line, a first destination identified by a single digit code consisting of the digit zero, a second destination identified by a first plural digit code having the digit zero as the first digit and also by a second plural digit code having a first digit other than zero, switching apparatus for completing a connection from said calling line to said first destination and to said second destination, time controlled means, means controlled in response to the transmission of said digit zero over said calling line for rendering said time controlled means effective, means controlled by said time controlled means after a determined elapsed time interval for operating said switching apparatus in a first manner to complete a connection from said calling line to said first destination, means controlled in response to the transmission of the additional digits of said first plural digit code before the elapse of said determined time interval following the transmission of said single digit zero for operating said switching apparatus in a second manner to complete a connection from said calling line to said second destination, and means controlled in response to the transmission of said second plural digit code over said calling line for operating said switching apparatus in said second manner to complete a connection from said calling line to said second destination.

11. In a telephone system, a calling line, a called destination identified by a directory number comprising a plural digit office code portion and a plural digit numerical portion and also by an arbitrary plural digit code, switching apparatus operative to complete a connection from said calling line to said called destination, a register sender controllable over said calling line to register the digits of said office code portion of said directory number or the digits of said arbitrary plural digit code, means controlled in response to the registration of said office code portion of said directory number in said register sender for automatically disconnecting said register sender from said calling line and for connecting said calling line to said switching apparatus so that said switching apparatus is directly controlled over said calling line by the digits of the numerical portion of said directory number for completing said connection from said calling line to said called destination and having the same number of digits trolled in response to the registration therein of said arbitrary plural digit code for operating said switching apparatus to complete said connection from said calling line to said called destination.

12. In a telephone system, a calling line, a called destination identified by a directory number comprising a plural digit code portion and a plural digit numerical portion, an arbitrary plural digit code also identifying said called destinatio and having the same number of digits as said plural digit code portion of said directory number, switching apparatus operative to complete a connection from said calling line to said called destination, means controlled in response to the transmission of said directory number from said calling line for operating said switching apparatus in a first manner to complete said connection from said calling line to said called destination, and means controlled in response to the transmission of said arbitrary plural digit code for operating said switching apparatus in a second manner to complete said connection from said calling line to said called destination.

13. In a telephone system, a calling line, a called destination identified by a directory number comprising a three digit code portion indicative of the exchange in which the called destination is located and a four digit numerical portion indicative of the particular called destination in the particular exchange, an arbitrary three digit code also identifying said called destination, a register sender, switching apparatus operative to complete a connection from said calling line to said called destination, means in said register sender for registering the three digit code portion of the directory number identifying said called destination or the arbitrary three digit code identifying said called destination transmitted from said calling line, a translator, means controlled in response to the registration of said three digit code portion of said directory number in said register sender for releasing said register sender so that the numerical digits of said directory number transmitted from said calling line will directly control said switching apparatus to complete a connection from said calling line to said called destination, means controlled in response to the registration of said arbitrary three digit code in said register sender for selecting said translator, means in said selected translator governed in accordance with the arbitrary code digits registered in said register sender for controlling said register sender to register therein digits corresponding to a translation of said arbitrary three digit code, and means in said register sender for operating said switching apparatus in accordance with the digits of said translation registered therein by said translator for completing the connection from said calling line to said called destination.

14. In a telephone system, a calling line, a called destination identified by a directory number comprising a three digit code portion indicative of the exchange in which the called destination is located and a four digit numerical portion indicative of the particular called destination in the particular exchange, an arbitrary three digit code also identifying said called destination, said arbitrary code including an arbitrary first digit and the tens and units digits of the four digit numerical portion of said called destination directory number, a register sender, switching apparatus operative to complete a connection from said calling line to said called destination, means in said register sender for registering the three digit code portion of the directory number identifying said called destination or the arbitrary three digit code identifying said called destination transmitted from said calling line, a translator, means controlled in response to the registration of said three digit code portion of said directory number in said register sender for releasing said register sender so that the numerical digits of said directory number transmitted from said calling line will directly control said switching apparatus to complete a connection from said calling line to said called destination, means controlled in response to the registration of said arbitrary three digit code in said register sender for selecting said translator, means in said selected translator governed in accordance with the arbitrary code digits registered in said register sender for controlling said register sender to register therein digits corresponding to a translation of said arbitrary three digit code, and means in said register sender for operating said switching apparatus in accordance with the digits of said translation registered therein by said translator and for then operating said switching apparatus in accordance with the particular tens and units digits of the arbitrary three digit code registered in said register sender in order to complete the connection from said calling line to said called destination.

15. In a telephone system, a calling line, a called destination identified by a directory number comprising a three digit code portion indicative of the exchange in which the called destination is located and a four digit numerical portion indicative of the particular called destination in the particular exchange, an arbitrary three digit code also identifying said called destination, said arbitrary code including an arbitrary digit and the tens and units digits of the four digit numerical portion of said called destination directory number, switching apparatus operative to complete a connection from said calling line to said called destination, a register sender operated to register said three digit code portion of said directory number or said arbitrary three digit code transmitted from said calling line, means in said register sender controlled responsive to the registration of said three digit code portion of said directory number therein for releasing said register sender so that the numerical digits of said directory number transmitted from said calling line directly control said switching apparatus to complete said connection from said calling line to said called destination, a translating device, and means in said register sender controlled in response to the registration of said arbitrary three digit code therein for operating said translating device to obtain a translation of said arbitrary three digit code and for operating said switching apparatus in accordance with said translation and in accordance with the tens and units digits of said arbitrary code to complete said connection from said calling line to said called destination.

16. The telephone system set forth in claim 8, and further comprising means for registering for billing purposes particulars of a completed telephone connection from said calling line to said called first destination or said called second destination, said particulars including an identification of said calling line and the particular called code employed in completing the telephone connection to the called one of said first or second destinations.

References Cited in the file of this patent
UNITED STATES PATENTS

| | | |
|---|---|---|
| 1,862,549 | Raymond | June 14, 1932 |
| 2,409,063 | Ostline | Oct. 8, 1946 |
| 2,535,511 | Ostline | Dec. 26, 1950 |

UNITED STATES PATENT OFFICE

CERTIFICATE OF CORRECTION

Patent No. 2,866,003 December 23, 1958

Thomas G. Walsh

It is hereby certified that error appears in the printed specification of the above numbered patent requiring correction and that the said Letters Patent should read as corrected below.

Column 32, line 8, after the word "destination", strike out "and having the same number of digits" and insert instead -- , and means in said register sender con- --.

Signed and sealed this 21st day of April 1959.

(SEAL)

Attest:

KARL H. AXLINE
Attesting Officer

ROBERT C. WATSON
Commissioner of Patents